(12) United States Patent
Pyrik et al.

(10) Patent No.: US 8,271,633 B2
(45) Date of Patent: Sep. 18, 2012

(54) CORRELATING NETWORK TRANSACTIONS

(75) Inventors: Daniel S. Pyrik, Lowell, MA (US); Kaynam Hedayat, Chestnut Hill, MA (US); Robert Naylor, Newburyport, MA (US)

(73) Assignee: EXFO Service Assurance Inc., Chelmsford, MA (US)

( * ) Notice: Subject to any disclaimer, the term of this patent is extended or adjusted under 35 U.S.C. 154(b) by 0 days.

(21) Appl. No.: 12/425,183

(22) Filed: Apr. 16, 2009

(65) Prior Publication Data
US 2010/0268797 A1 Oct. 21, 2010

(51) Int. Cl.
*G06F 15/173* (2006.01)
(52) U.S. Cl. ......... 709/223; 709/203; 709/224; 370/242
(58) Field of Classification Search .................. 709/223, 709/224, 230, 203, 235; 370/242, 352
See application file for complete search history.

(56) References Cited

U.S. PATENT DOCUMENTS

| | | | | |
|---|---|---|---|---|
| 6,108,782 | A * | 8/2000 | Fletcher et al. | 709/224 |
| 6,751,663 | B1 * | 6/2004 | Farrell et al. | 709/223 |
| 6,870,926 | B2 * | 3/2005 | Shambaugh et al. | 379/265.05 |
| 7,293,083 | B1 * | 11/2007 | Ranous et al. | 709/224 |
| 7,447,768 | B2 * | 11/2008 | Kelly et al. | 709/224 |
| 7,453,817 | B1 * | 11/2008 | Hansen | 370/242 |
| 7,676,032 | B2 * | 3/2010 | Mark et al. | 709/203 |
| 7,809,829 | B2 * | 10/2010 | Kelly et al. | 709/224 |
| 2004/0071130 | A1 * | 4/2004 | Doerr et al. | 370/352 |
| 2006/0245575 | A1 * | 11/2006 | Dammrose | 379/229 |
| 2008/0037443 | A1 * | 2/2008 | Ansari et al. | 370/254 |

* cited by examiner

*Primary Examiner* — Ramy M Osman
(74) *Attorney, Agent, or Firm* — Pierce Atwood LLP; Joseph M. Maraia

(57) ABSTRACT

The correlating network transactions techniques include a method, an apparatus, and/or a computer program product. In some embodiments of these techniques, the method includes receiving, at a first monitor server, a first plurality of network transmissions from a first plurality of communication networks and correlating, at the first monitor server, the first plurality of network transmissions based on information associated with the first plurality of network transmissions to form a first correlated network transaction. The method further includes transmitting the first correlated network transaction from the first monitor server to a second monitor server based on a first correlation flag and correlating, at the second monitor server, the first correlated network transaction with a second network transmission based on at least one of the first correlation flag, information associated with the second network transmission, and information associated with the first correlated network transaction to form a second correlated network transaction.

24 Claims, 15 Drawing Sheets

Received Signaling Data
800a

| Identifier | Source | Destination | Capture | Packet |
|---|---|---|---|---|
| A | 10.10.10.10 | 10.30.30.30 | 10.10.10.1 | INVITE |
| B | 10.10.10.10 | 10.30.30.30 | 192.168.4.2 | INVITE |
| C | 10.10.10.10 | 10.30.30.30 | 10.30.30.1 | INVITE |

FIG. 8A

Received Signaling Data
800b

| Identifier | Source | Destination | Capture | Packet |
|---|---|---|---|---|
| A | 10.10.10.10 | 10.30.30.30 | 192.168.4.2 | INVITE |
| B | 10.30.30.30 | 10.10.10.10 | 192.168.6.6 | OK |
| C | 10.10.10.10 | 10.30.30.30 | 10.30.30.1 | ACK |

FIG. 8B

Received Signaling Data
800c

| Identifier | Source | Destination | Capture | Packet |
|---|---|---|---|---|
| A | 10.10.10.10 | 10.30.30.30 | 192.168.4.2 | INVITE |
| B | 10.10.10.10 | 10.30.30.30 | 192.168.3.2 | INVITE |
| C | 10.30.30.30 | 10.10.10.10 | 192.168.6.6 | OK |
| D | 10.10.10.10 | 10.30.30.30 | 10.10.10.1 | BYE |
| E | 10.10.10.10 | 10.30.30.30 | 10.30.30.1 | BYE |

FIG. 8C

Received Signaling Data
800d

| Identifier | Source | Destination | Capture | Packet |
|---|---|---|---|---|
| A | 10.10.10.10 | 10.30.30.30 | 10.10.10.1 | PLAY |
| B | 10.10.10.10 | 10.30.30.30 | 192.168.4.2 | PLAY |
| C | 10.10.10.10 | 10.30.30.30 | 10.30.30.1 | PLAY |

FIG. 8D

Received Signaling Data
800e

| Identifier | Source | Destination | Capture | Packet |
|---|---|---|---|---|
| A | 10.10.10.10 | 10.30.30.30 | 192.168.4.2 | SETUP |
| B | 10.30.30.30 | 10.10.10.10 | 192.168.6.6 | OK |
| C | 10.10.10.10 | 10.30.30.30 | 10.30.30.1 | PLAY |

FIG. 8E

Received Signaling Data
800f

| Identifier | Source | Destination | Capture | Packet |
|---|---|---|---|---|
| A | 10.10.10.10 | 10.30.30.30 | 192.168.4.2 | SETUP |
| B | 10.10.10.10 | 10.30.30.30 | 192.168.3.2 | SETUP |
| C | 10.30.30.30 | 10.10.10.10 | 192.168.6.6 | RECORD |
| D | 10.10.10.10 | 10.30.30.30 | 10.10.10.1 | TEARDOWN |
| E | 10.10.10.10 | 10.30.30.30 | 10.30.30.1 | TEARDOWN |

FIG. 8F

Received Signaling Data
800g

| Identifier | Source | Destination | Capture | Sequence No. |
|---|---|---|---|---|
| A | 10.10.10.10 | 10.30.30.30 | 10.10.10.2 | 1000 |
| B | 10.40.40.40 | 10.50.50.50 | 10.30.30.2 | 1000 |
| C | 10.10.10.10 | 10.30.30.30 | 192.168.4.2 | 1000 |
| D | 10.10.10.10 | 10.30.30.30 | 10.10.10.2 | 1002 |
| E | 10.10.10.10 | 10.30.30.30 | 192.168.2.2 | 1004 |
| F | 10.40.40.40 | 10.50.50.50 | 10.10.10.2 | 1000 |
| G | 10.10.10.10 | 10.30.30.30 | 10.30.30.2 | 1002 |
| H | 10.10.10.10 | 10.30.30.30 | 10.30.30.2 | 1004 |
| I | 10.40.40.40 | 10.50.50.50 | 10.30.30.2 | 1004 |
| J | 10.10.10.10 | 10.10.10.10 | 192.168.2.2 | 2000 |
| K | 10.30.30.30 | 10.10.10.10 | 192.168.4.2 | 2000 |
| L | 10.30.30.30 | 10.50.50.50 | 192.168.4.2 | 2000 |
| M | 10.30.30.30 | 10.10.10.10 | 10.50.50.2 | 2000 |

FIG. 8G

CORRELATING NETWORK TRANSACTIONS

BACKGROUND OF THE INVENTION

Passive monitoring of Voice over Internet Protocol (VoIP) calls is a way of measuring network performance and troubleshooting signaling problems in a network. This monitoring preferably needs visibility into all messages in call signaling transactions. However, it is common that at any point in the network only part of the signaling flow is visible. It is also likely that monitoring complete VoIP transactions is not possible due to the in-deterministic routing nature of the internet protocol (IP) and requires deployment of multiple monitoring probes in the network. Generally, in order to measure network and call quality completely, information for the entire call must be gathered from each device and correlated at a central location.

There are several different possibilities for the choice of this central location. First, a central server could be used. However, this solution is not scalable since many thousands of calls may be detected across a multitude of monitoring devices throughout the network. Second, the monitoring devices could be organized into groups, where information pertaining to each partial call detected by a member of the group is shared with all other group members. This method wastes network bandwidth, and does not allow monitoring when a call is seen by devices belonging to different groups. Thus, a need exists to improve correlating network transactions in this technology field.

SUMMARY OF THE INVENTION

One approach to correlating network transactions is a method. The method includes receiving, at a first monitor server, a first plurality of network transmissions from a first plurality of communication networks. The method further includes correlating, at the first monitor server, the first plurality of network transmissions based on information associated with the first plurality of network transmissions to form a first correlated network transaction. The method further includes transmitting the first correlated network transaction from the first monitor server to a second monitor server based on a first correlation flag. The method further includes correlating, at the second monitor server, the first correlated network transaction with a second network transmission based on at least one of the first correlation flag, information associated with the second network transmission, and information associated with the first correlated network transaction to form a second correlated network transaction.

Another approach to correlating network transactions is a computer program product. The computer program product is tangibly embodied in a computer readable medium. The computer program product includes instructions being operable to cause a data processing apparatus to receive a first plurality of network transmissions from a first plurality of communication networks. The computer program product further includes instructions being operable to cause a data processing apparatus to correlate the first plurality of network transmissions based on information associated with the first plurality of network transmissions to form a first correlated network transaction. The computer program product further includes instructions being operable to cause a data processing apparatus to transmit the first correlated network transaction from a first monitor server to a second monitor server based on a first correlation flag. The computer program product further includes instructions being operable to cause a data processing apparatus to correlate the first correlated network transaction with a second network transmission based on at least one of the first correlation flag, information associated with the second network transmission, and information associated with the first correlated network transaction to form a second correlated network transaction.

Another approach to correlating network transactions is an apparatus. The apparatus includes a first communication module, a first correlation module, a second communication module, and a second correlation module. The first communication module is configured to receive a first plurality of network transmissions from a first plurality of communication networks. The first correlation module is configured to correlate the first plurality of network transmissions based on information associated with the first plurality of network transmissions to form a first correlated network transaction. The second communication module is configured to receive the first correlated network transaction, the first correlated network transaction routed to the second communication module based on a first correlation flag. The second correlation module is configured to correlate the first correlated network transaction with a second network transmission based on at least one of the first correlation flag, information associated with the second network transmission, and information associated with the first correlated network transaction to form a second correlated network transaction.

Another approach to correlating network transactions is an apparatus. The apparatus includes a means for receiving a first plurality of network transmissions from a first plurality of communication networks. The apparatus further includes a means for correlating the first plurality of network transmissions based on information associated with the first plurality of network transmissions to form a first correlated network transaction. The apparatus further includes a means for receiving the first correlated network transaction, the first correlated network transaction routed to the means for receiving the first correlated network transmission based on a first correlation flag. The apparatus further includes a means for correlating the first correlated network transaction with a second network transmission based on at least one of the first correlation flag, information associated with the second network transmission and information associated with the first correlated network transaction to form a second correlated network transaction.

In other examples, any of the approaches above can include one or more of the following features. In some examples, the method further includes determining a network performance metric based on the second correlated network transaction.

In other examples, the method further includes modifying a network configuration parameter based on the network performance metric.

In some examples, the first correlated network transaction is different from the second correlated network transaction.

In other examples, the second correlated network transaction includes a portion of the first correlated network transaction.

In some examples, the plurality of network transmissions includes call signaling, a data packet, a voice communication packet, a session initiation protocol packet, a transmission control protocol packet, an internet protocol packet, a voice over internet protocol packet, and/or a real-time transport protocol packet.

In other examples, the method further includes generating, at the first monitor server, the first correlation flag based on at least one of the first correlated network transaction and information associated with a network transaction.

In some examples, the method further includes determining, at the first monitor server, if the first correlated network transaction is a complete network transaction.

In other examples, the correlation flag indicating that the first correlated network transaction includes a complete network transaction.

In some examples, the method further includes receiving, at a third monitor server, a third plurality of network transmissions from a third plurality of communication networks. The method can further include correlating, at the third monitor server, the third plurality of network transmissions based on information associated with the third plurality of network transmissions to form a third correlated network transaction. The method can further include communicating the third correlated network transaction from the third monitor server to the second monitor server based on a third correlation flag.

In other examples, the method further includes correlating, at the second monitor server, the first correlated network transaction, the second network transmission, and the third correlated network transaction based on at least one of the first correlation flag, the third correlation flag, information associated with the second network transmission, information associated with the first correlated network transaction, and information associated with the third correlated network transaction to form a network transaction.

In some examples, at least a portion of the plurality of network transmissions being same as at least a portion of the second plurality of network transmissions.

In other examples, the information associated with the first correlated network transaction includes a session initiation protocol, a transmission control protocol, an internet protocol, a voice over internet protocol, and/or a real-time transport protocol.

In some examples, the information associated with the first plurality of network transmissions includes recipient information, transmitter information, and/or network information.

In other examples, the method further includes monitoring, at the first monitor server, the first plurality of communication networks for the first plurality of network transmissions.

In some examples, at least one of the first plurality of communication networks is associated with a transmitter of a network transmission and at least one other of the first plurality of communication networks is associated with a recipient of the network transmission.

In other examples, the apparatus further includes a network control module configured to determine a network performance metric based on the second correlated network transaction.

In some examples, the apparatus further includes network control module further configured to modify a network configuration parameter based on the network performance metric.

In other examples, the apparatus further includes a third communication module configured to receive a third plurality of network transmissions from a third plurality of communication networks. The apparatus can further include a third correlation module configured to correlate the third plurality of network transmissions based on information associated with the third plurality of network transmissions to form a third correlated network transaction. The apparatus can further include the third communication module further configured to communicate the third correlated network transaction to the second correlation module based on a third correlation flag.

In some examples, the apparatus further includes the second correlation module configured to correlate the first correlated network transaction, the second network transmission, and the third monitor server based on at least one of the first correlation flag, the third correlation flag, information associated with the second network transmission, information associated with the first correlated network transaction, and information associated with the third correlated network transaction to form a network transaction.

In other examples, the apparatus further includes a storage module configured to store the first correlated network transaction.

The correlating network transactions techniques described herein can provide one or more of the following advantages. One such advantage to correlating at multiple monitor servers includes the flexible hierarchical configuration of the passive monitoring servers thereby increasing the efficiency and scalable of the network by distributing the correlation processing and reducing the transmission overhead of the monitoring. Another advantage to correlating at multiple monitor servers includes grouping the monitor servers together so that calls throughout an entire network can be monitored, even when individual monitoring servers can only monitor receive-only traffic (or only transmitted traffic).

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

FIGS. 8A-8G are exemplary diagrams of received signaling data;

DETAILED DESCRIPTION OF THE PREFERRED EMBODIMENTS

As a general overview of the technology, packet-based networks (e.g., Voice over Internet Protocol (VoIP), Internet Protocol (IP), Transmission Control Protocol (TCP), etc.) are distributed networks, and the network transactions (e.g., call signaling transaction, data transaction, multimedia transaction, etc.) are processed in multiple locations on the distributed networks. The transactions include network transmissions (e.g., packets, call signaling packets, data packets, multimedia packets, etc.), and the network transmissions may travel different paths and converge at certain processing points on the network. The distributed architecture of packet-based networks along with non-deterministic nature of packet routing introduces new challenges in monitoring network transactions by third party devices (e.g., monitor server) that are not part of the network transaction path.

For example, the monitoring of VoIP transactions at a given point in the network may require deployments of two or more servers that monitor different physical links independently for each direction (transmit and receive) of the signaling flow. This technology is directed to distributed monitor servers for passively monitoring network transactions (e.g., VoIP calls, video calls, multimedia streams, etc.) using any number of monitoring devices and correlating different parts of the same transaction. Collectively, the monitor servers observe the complete network transaction by correlating the network transmissions. The complete network transaction can be utilized to determine network performance metrics for reporting and/or network optimization.

This technology advantageously enables the monitor servers to share the network transmissions and/or the correlated network transaction amongst each other for correlation in a scalable and distributed manner that reduces the workload of each individual monitor server and the network communication lines. For example, the technology could enable the monitor servers to scale from one hundred calls per hour at one location to one hundred million busy hour calls across two hundred locations.

Figure 1:
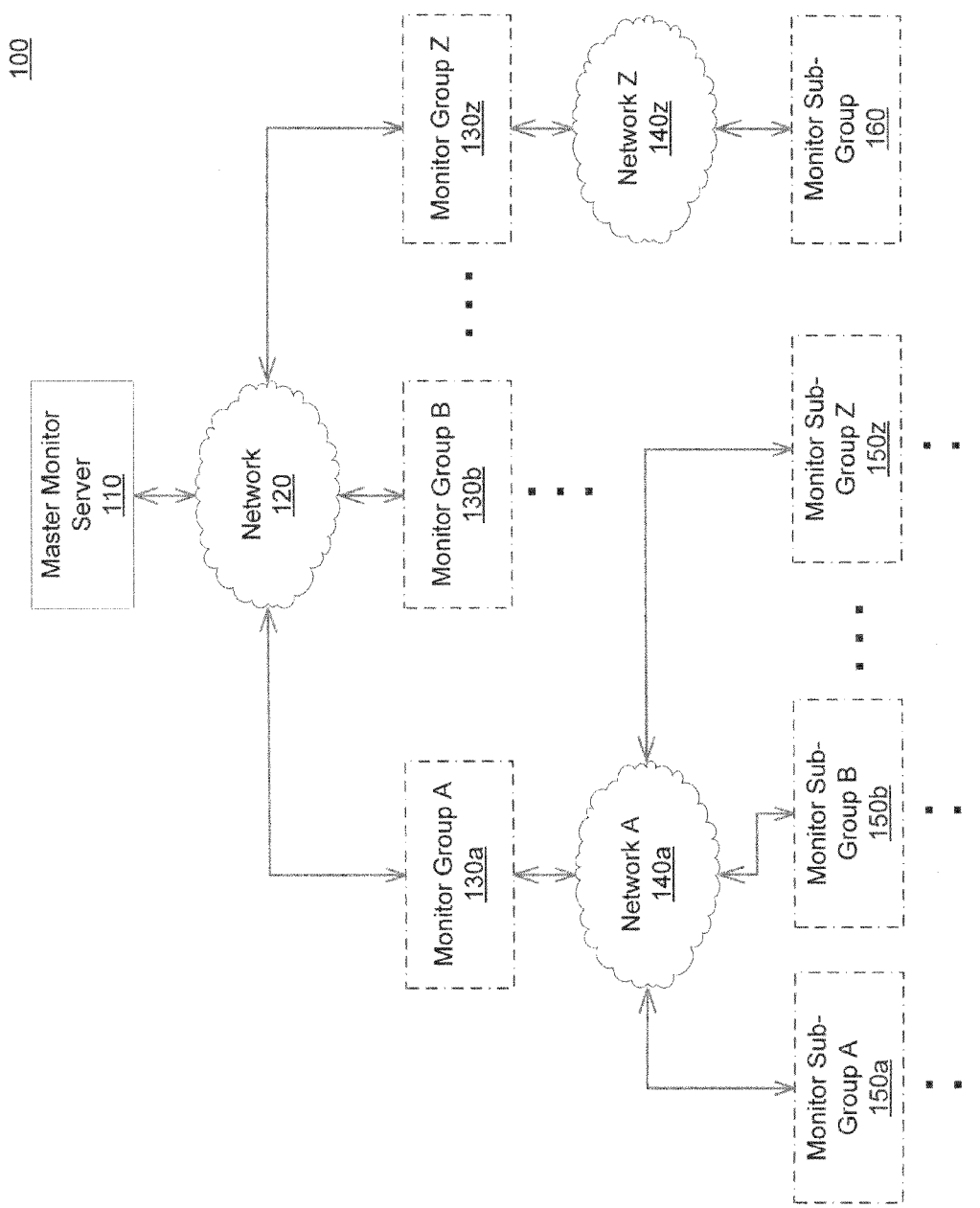
FIG. 1 is a block diagram of an exemplary system for monitoring a network.

FIG. 1 is a block diagram of an exemplary system 100 for monitoring a network. The system 100 includes a master monitor server 110, a network 120, monitor group A 130*a*, monitor group B 130*b*, . . . monitor group Z 130*z*, network A 140*a* . . . network Z 140*z*, monitor sub-group A 150*a*, monitor sub-group B 150*b*, . . . monitor sub-group Z 150*z*, and a monitor sub-group 160. The master monitor server 110 in the monitor groups 130 communicate via the network 120. The monitor sub-groups 150 and 160 communicate via the networks 140 with the monitor groups 130.

Each monitor group 130 and/or monitor sub-group 150 and 160 can include one or more communication devices (not shown). The communication devices call be any type of device that can communication between each other (e.g., phone, laptop, computer, television, etc.). The communication devices can communicate with each other via network transmissions transmitted via one or more of the networks 120, 140*a*, and 140*z*.

In some examples, a first communication device in the monitor sub-group A 150*a* communicates with a second communication device in the monitor sub-group 160. The first communication device transmits a network transmission to the second communication device via the network A 140*a*, the network 120, and the network Z 140*z*. In this example, the network transmission is received at the monitor servers (not shown) associated with the monitor sub-group A 150*a*, the monitor group A 130*a*, the monitor group Z 130*z*, and the monitor sub-group 160 as the network transmission is transmitted via the networks as described above. The monitor servers in each respective monitor sub-group 150 and 160 correlate the network transmission and communicate the partially correlated network transmission to the monitor servers in the corresponding monitor group 130 (in this example, the monitor server in the monitor sub-group A 150*a* communicates with the monitor server in the monitor group A 130*a* and the monitor server in the monitor sub-group 160 communicates with the monitor server in the monitor group Z 130*z*). An advantage of the monitor servers is that the monitor servers provide a local point of processing at each monitor sub-group and group thereby decreasing the processing needed at the master monitor server.

The monitor servers in each respective monitor group 130 correlate the network transmissions received at each monitor server and the correlated network transaction (e.g., partially correlated network transaction, one network transmission, etc.) received from the monitor server in the respective monitor sub-group (150 and 160). The monitor servers in each respective monitor group 130 transmit the correlated network transaction to the master monitor server 110. The master monitor server 110 correlates the received correlated network transactions and/or any other received network transmissions to form the complete network transaction (e.g., correlation of all received network transmissions, all network transmissions between the communication devices, a summary of all network transmissions between the communication devices, network data to determine a network performance metric, etc.). The master monitor server 110 can generate network performance metrics (e.g., network latency metric, call creation metric, call drop metric, etc.) based on the complete network transaction and can utilize the network performance metrics to modify the network (e.g., modify routing information based on a call drop metric, modify network priorities based on a call creation metric, etc.).

In other examples, if any of the monitor servers correlate the network transmission to form a complete network transaction, the monitor server communicates the correlated network transaction to the master monitor server 110. For example, if a first communication device communicates with a second communication device and both of these communication devices are in monitor sub-group A 150*a*, then the monitor server associated with the monitor sub-group A 150*a* can correlate the network transmissions between the devices to form a correlated network transaction. In this example, the monitor server associated with the monitor sub-group A 150*a* transmits the completely correlated network transaction directly to the master monitor server which bypassing any intermediate monitor groups, i.e., the monitor group A 130*a*. The bypassing of intermediate monitor groups and/or monitor sub-groups when a monitor server correlates a complete network transactions advantageously lowers the overall processing load and network congestion for the entire system 100 by maximizing the local correlation of the network transmission. In other words, the network transmissions are correlated by a monitor server as close to reception of the network transmissions as possible instead of the network transmissions being transmitted to a centralized monitor server for correlation (i.e., lowest common denominator correlation). For example, if both communication devices are connected to a network in an office building, then the monitor server associated with the office building can correlate the network transmissions instead of another monitor server associated with a different office building (i.e., in a different city, state, region, country, etc.).

In some examples, the monitor groups 130 and monitor sub-groups 150 and 160 are configured based on organizational and/or geographical parameters. For example, the monitor group A 130*a* is associated with Company A's offices in Boston, Mass., the monitor group B 130*b* is associated with Company A's offices in New York City, N.Y., and the monitor group Z 130*z* is associated with Company A's offices in London, England. The monitor sub-group A 150*a* is associated with Company A's first office in Boston, the monitor sub-group B 150*b* is associated with Company A's second office in Boston, and the monitor sub-group Z 150*z* is associated with Company A's twenty-sixth office in Boston. In this regard, the monitor groups 130 and monitor sub-groups 150 and 160 organizational structure can be optimized to minimize the transmission of correlated network transactions among geographical diverse areas which decreases the network traffic on the networks.

In other examples, the monitor groups 130 and monitor sub-groups 150 and 160 are configured based on organizational structure (e.g., organizational parameter, organization hierarchy, etc.), geographical parameters, and/or any other type of information (e.g., network usage parameters, dynamically generated parameters, network performance metric, etc.). As a further example, the monitor group A 130a is associated with Company A's offices in Boston, Mass. and based on network usage between Company A's offices in Boston and Company A's offices in Berlin, Germany (e.g., high call volume between the offices, high video transfer between the offices, etc.), the monitor group A 130a is reconfigured to include Company A's offices in both Boston and Berlin.

As illustrated in FIG. 1, the system 100 can include any number of monitor groups and/or monitor sub-groups. The correlation of the network transmissions at the lowest available monitor group and/or monitor sub-group advantageously provides for the expansion and implementation of the system, 100 across large global networks by reducing the workload at each individual monitor server and at the master monitor server 110.

Figure 2:
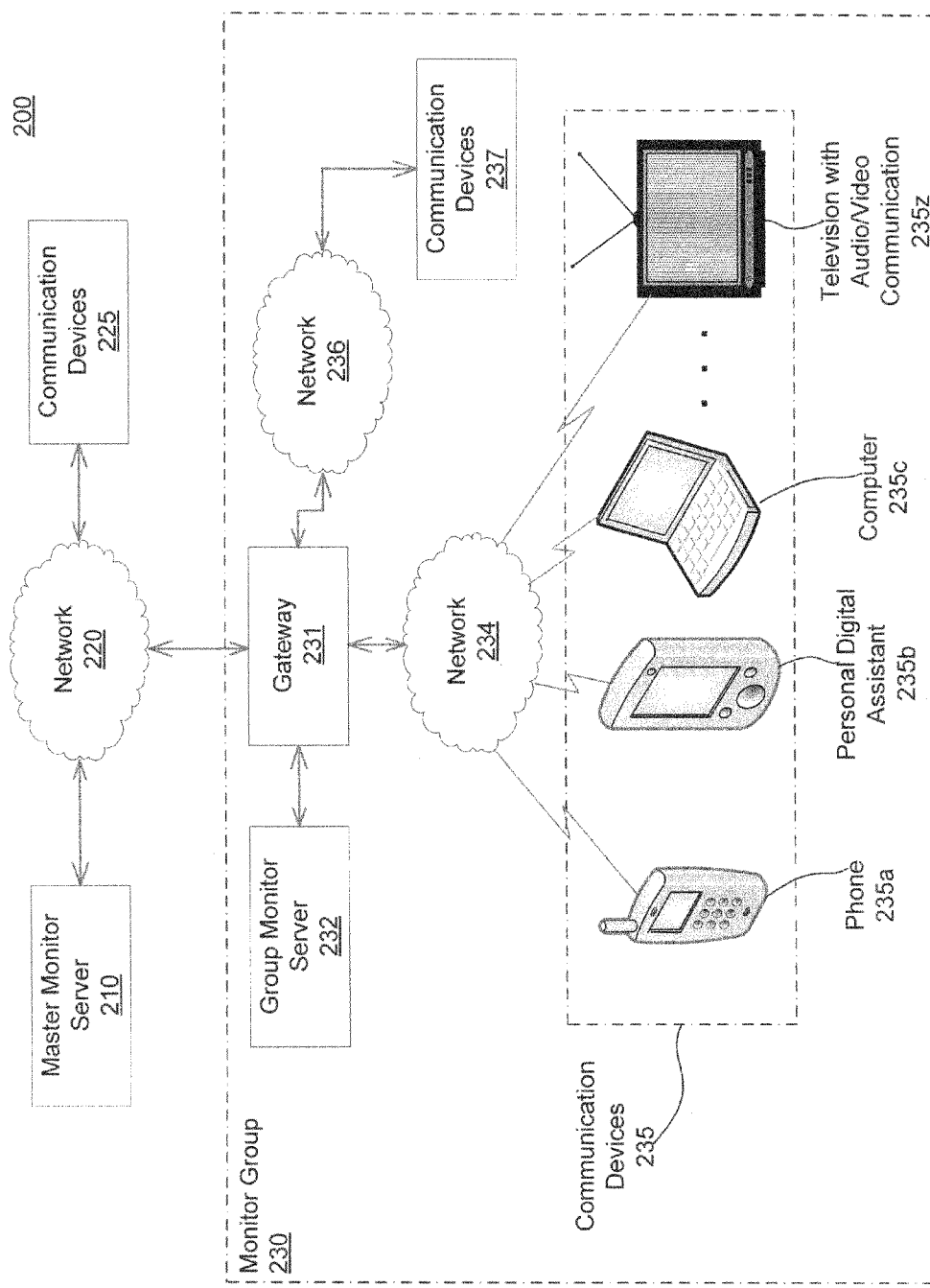
FIG. 2 is a block diagram of another exemplary system for monitoring a network.

FIG. 2 is a block diagram of another exemplary system 200 for monitoring a network. The system 200 includes a master monitor server 210, a network 220, communication devices 225, and a monitor group 230. The monitor group 230 includes a group monitor server 232, a gateway 231, a network 234, communication devices 235, a network 236, and communication devices 237. The communication devices 235 can include a phone 235a, a persona digital assistant 235b, a computer 235c, a television with audio/video communication capabilities 235z, and/or any other type of communication device. The master monitor server 210, the communication devices 225, and the monitor group 230 including the group monitor server 232, the communication devices 237, the communication devices 235, and the gateway 231 communicate via the network 220, the network 234, and/or the network 236.

The communication devices 225, 235, and 237 communicate with each other via the networks 234 and 220. For example, the phone 235a communicates with the television with audio/video communication 235z via the network 234. As another example, the personal digital assistant 235b communication with a phone (not shown) in the communication devices 225 via the networks 234 and 220. The network transmissions between the communication devices are monitored by the group monitor server 232 and/or the master monitor server 210. In other words, the group monitor server 232 and/or the master monitor server 210 receive the network transmissions communicated via the networks 234, 236, and 220, respectively.

The group monitor server 232 monitors and/or receives the network transmissions transmitted via networks 234 and 236 via the gateway 231. The gateway 231 acts as a router between the networks 220, 234, and 236 and transmits the network transmissions to the group monitor server 232 via a shadow network port (e.g., network connection between the shadow network port and the group monitor server 232). In other examples, the group monitor server 232 is part of the gateway 231 (i.e., a component of the gateway 231) and receives the network transmissions as a component on the bus of the gateway 231.

The master monitor server 210 monitors and/or receives the network transmissions transmitted via the network 220 by monitoring and acting as a packet analyzer (i.e., a packet sniffer) on the network 220. The master monitor server 210 receives correlated network transactions from the group monitor server 232. The master monitor server 210 correlates the correlated network transactions and/or the received network transmissions from the network 220.

In some examples, the master monitor server 210 receives a completely correlated network transaction from the group monitor server 232. The identification of the completely correlated network transaction by the master monitor server 210 can be based on a correlation flag. The group monitor server 232 can generate the correlation flag based on the correlated network transaction and/or any other information associated with the correlated network transaction. The other information associated with the correlated network transaction can include, for example, information associated with the network transmissions but not included in the correlated network transaction, information inferred from and/or determined based on the correlated network transaction (e.g., network performance metric, type of network transmission packet, etc.), and/or any other type of information associated with the network.

For example, the phone 235a and a phone (not shown) connected to the network 220 communicate network transmissions between each other (e.g., a VoIP call, a video call, etc.). The group monitor sever 232 receives the network transmissions communicated via the network 234, and the master monitor server 210 receives the network transmissions communicated via the network 220. The group monitor server 232 correlates the received network transmissions based on information associated with the network transmissions to form a correlated network transaction. The group monitor server 232 generated a correlation flag based on the correlated network transaction and or the information associated with the network transmissions.

As a further example, the group monitor server 232 transmits the correlated network transaction to the master monitor server 210 based on the correlation flag. For example, if the correlation flag indicates a complete network transaction, the group monitor server 232 transmits the correlated network transaction to port 61001 on the master monitor server 210 (i.e., the master monitor server 210 listening on this port for complete network transactions). As another example, if the correlation flag indicates an incomplete network transaction, the group monitor server 232 transmits the correlated network transaction to port 61002 on the master monitor server 210 (i.e., the master monitor server 210 listening on this port for incomplete network transactions).

As a further example, the master monitor server 210 checks the correlation flag associated with the received correlated network transaction. In other examples, the master monitor server 210 utilizes the port number that the correlated network transaction is received on to determine if the received correlated network transaction is a complete network transaction. If the correlation flag and/or port number indicates that the received correlated network transaction is a complete network transaction, the master monitor server 210 stores the received correlated network transaction. If the correlation flag and/or port number indicates that the received correlated network transaction is an incomplete network transaction, the master monitor server 210 correlates the received correlated network transaction with other received correlated network transactions and/or received network transmissions to form a second correlated network transaction (e.g., a complete correlated network transaction). The correlation by the master monitor server 210 can be based on the correlation flag, the information associated with the received network transmissions, and/or the information associated with the received correlated network transaction (e.g., matches recipient network address and the transmitter network address, matches stream identifier in the network transmissions, associates network transmission payloads, etc.).

In some examples, the second correlated network transaction includes part or all of the received correlated network transaction. In other words, parts of the received correlated network transaction can be included in the second correlated network transaction.

In other examples, the second correlated network transaction is different from the received correlated network transaction. In other words, additional data and/or information is included in the second correlated network transaction that is not included in the received correlated network transaction. In some examples, the second correlated network transaction includes the same data and/or information as the received correlated network transaction. For example, if the received network transmissions received by the master monitor server 210 are already included in the received correlated network transaction (e.g., the non-redundant parts, the needed parts, etc.), the second correlated network transaction is substantially similar to the received correlated network transaction.

Figure 3:
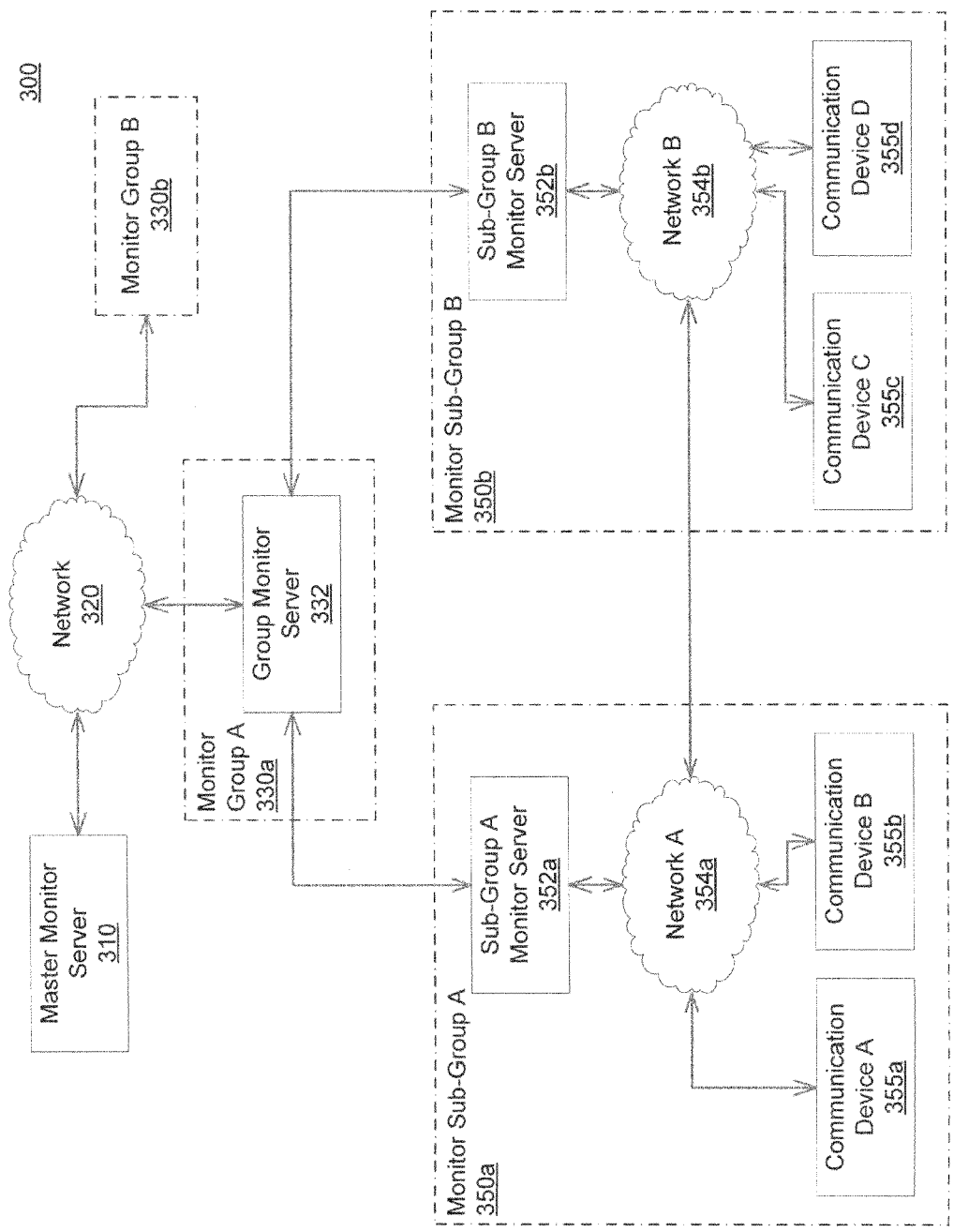
FIG. 3 is a block diagram of another exemplary system for monitoring a network.

FIG. 3. is a block diagram of another exemplary system 300 for monitoring a network. The system 300 includes a master monitor server 310, a network 320, a monitor group B 330b, a monitor group A 330a, a monitor sub-group A 350a, a monitor sub-group B 350b. The monitor group A 330 includes a group monitor server 332. The monitor sub-group A 350a includes a sub-group A 352a, a network A 354a, a communication device A 355a, and a communication device B 355b. The monitor sub-group B 350b includes a sub-group B monitor server 352b, a network B 354b, a communication device C 355c, and a communication device D 355d.

The communication devices 355a, 355b, 355c, and 355d (generally referred to as 355) communicate with each other via the networks 354a and 354b. The sub-group monitor servers 352a and 352b monitor the networks 354a and 354b, respectively, and receives network transmissions from the respective networks 354a and 354b. Each sub-group monitor server 352a and 352b correlates the received network transmissions to form a correlated network transaction and transmits the correlated network transaction based on a correlation flag.

In some examples, if the correlation flag indicates that the correlated network transaction is completely correlated (e.g., all network transmissions for a call signaling procedure are included in the correlated network transaction, an adequate quantity and/or quality of information is included in the correlated network transaction to generate a network performance metric, etc.), the sub-group monitor server 352a or 352b transmits the correlated network transaction to the master monitor server 310. For examples the sub-group A monitor server 352a receives all of the network transmissions for a VoIP call between communication devices A 355a and B 355b, and thus the sub-group A monitor server 352a can correlate a complete network transaction of the VoIP call.

The master monitor server 310 can store the correlated network transaction for viewing and/or processing. The master monitor server 310 can display via a display device the stored correlated network transaction (e.g. for network transaction analysis for detailed troubleshooting, etc.).

The master monitor server 310 can generate a network performance metric based on the correlated network transaction. For example, the master monitor server 310 generates a network performance metric (in this example, call drop percentage) based on the correlated network transaction (in this example, information associated with a construction of a call multiple times without a deconstruction of a call).

In other examples, if the correlation flag indicates that the correlated network transaction is not completely correlated (e.g., a side of the call signaling is missing, number of network transmissions below a predetermined and/or a dynamically configured threshold, etc.), the sub-group monitor server 352a or 352b transmits the correlated network transaction to the group monitor server 332. For example, in some configurations of the system 300, neither sub-group monitor server 352a or 352b can monitor the complete network transaction between communication devices B 355b and C 355c, and thus, the sub-group monitor servers 352a and 352b cannot correlate a complete network transaction (e.g., delay between both communication devices is needed for network performance metric, packets being transmitted via intermediate networks, etc.). However, in other configurations, one of the sub-group monitor servers 352a or 352b can correlate a complete network transaction (e.g., only one side of each packet is needed for network performance metric, all packets are monitored by a single monitor server, etc.). In this example, the sub-group monitor server 352a or 352b transmits the correlated network transaction to the group monitor server 332 based on the hierarchy of the groups in the system 300 (i.e., the monitor sub-group A 350a and the monitor sub-group B 350b are sub-groups of the monitor group A 330a).

The group monitor server 332 receives the one or more correlated network transactions from the respective sub-group monitor server 352a or 352b. The group monitor server 332 correlates the received correlated network transactions with other network transmissions, if applicable, to form a third correlated network transaction. As discussed above regarding the correlation flag and transmission thereof, the group monitor server 332 transmits the third correlated network transaction to the master monitor server 310 based on a third correlation flag (e.g., if the third correlation flag indicates a complete network transaction, to a first port on the master monitor server 310, if the third correlation flag indicates an incomplete network transaction, to a second port on the master monitor server 310, etc.).

As discussed herein, the master monitor server 310 receives the correlated network transaction and then can correlate the correlated network transaction with other network transactions and or network transmissions, can store the received correlated network transaction, and/or can generate network performance metrics. These actions and/or processing by the master monitor server 310 can be based on the received correlated network transaction, the correlation flag associated with the received network transaction, another correlation flag associated with the other network transactions and/or network transmissions, and/or any other information associated with any of the correlated network transactions and/or network transmissions.

Figure 4:
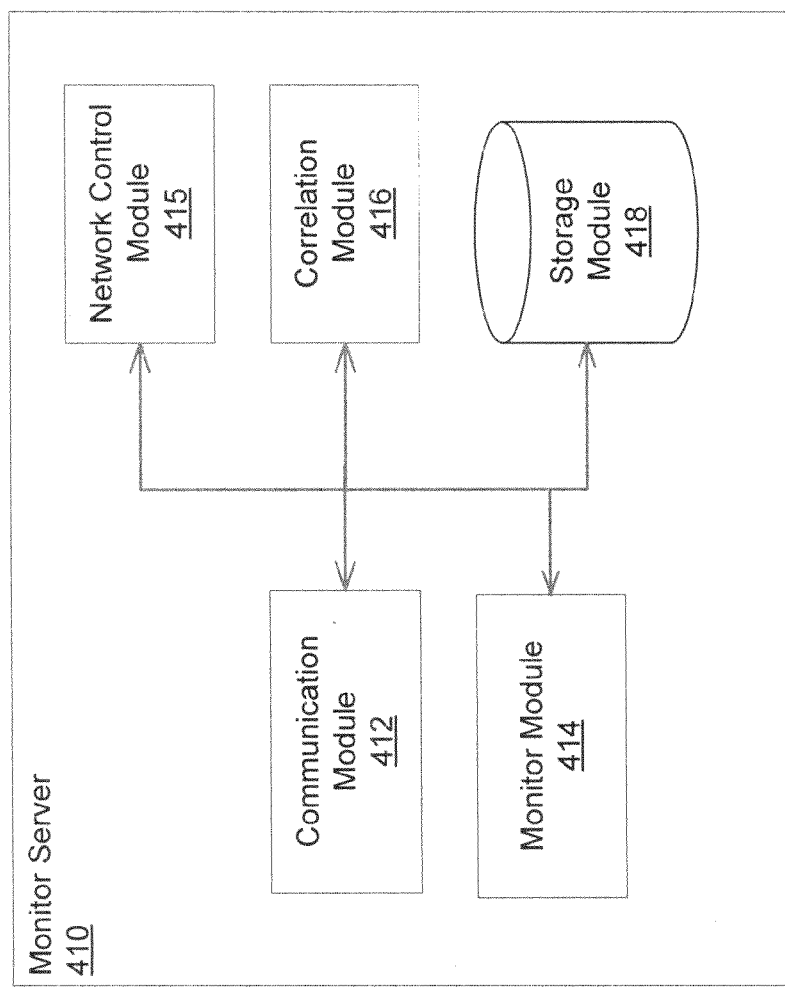
FIG. 4 is a block diagram of an exemplary monitor server in a system.

FIG. 4 is a block diagram of an exemplary monitor server 410 in a system 400. The monitor server 410 includes a communication module 412, a monitor module 414, a network control module 415, a correlation module 416, and a storage module 418. The communication module 412 receives a plurality of network transmissions and/or network transactions from one or more communication networks (also generally referred to as networks) and/or transmits a plurality of network transmissions and/or network transactions to the one or more communication networks. The monitor module 414 monitors the communication networks for network transmissions. The network control module 415 determines a network performance metric based on correlated network transaction and/or network transmissions. The network control module 415 further modifies a network configuration parameter based on the network performance metric. The correlation module 416 correlates the network transmissions and/or the received correlated network transactions based on information associated with the network transmissions and/or any other information to form a correlated network transaction. The storage module 418 stores the network transmissions, the information associated with the network transmission, the correlated network transactions, the correlation flags, and/or any other information associated with the system 400.

Figure 5:
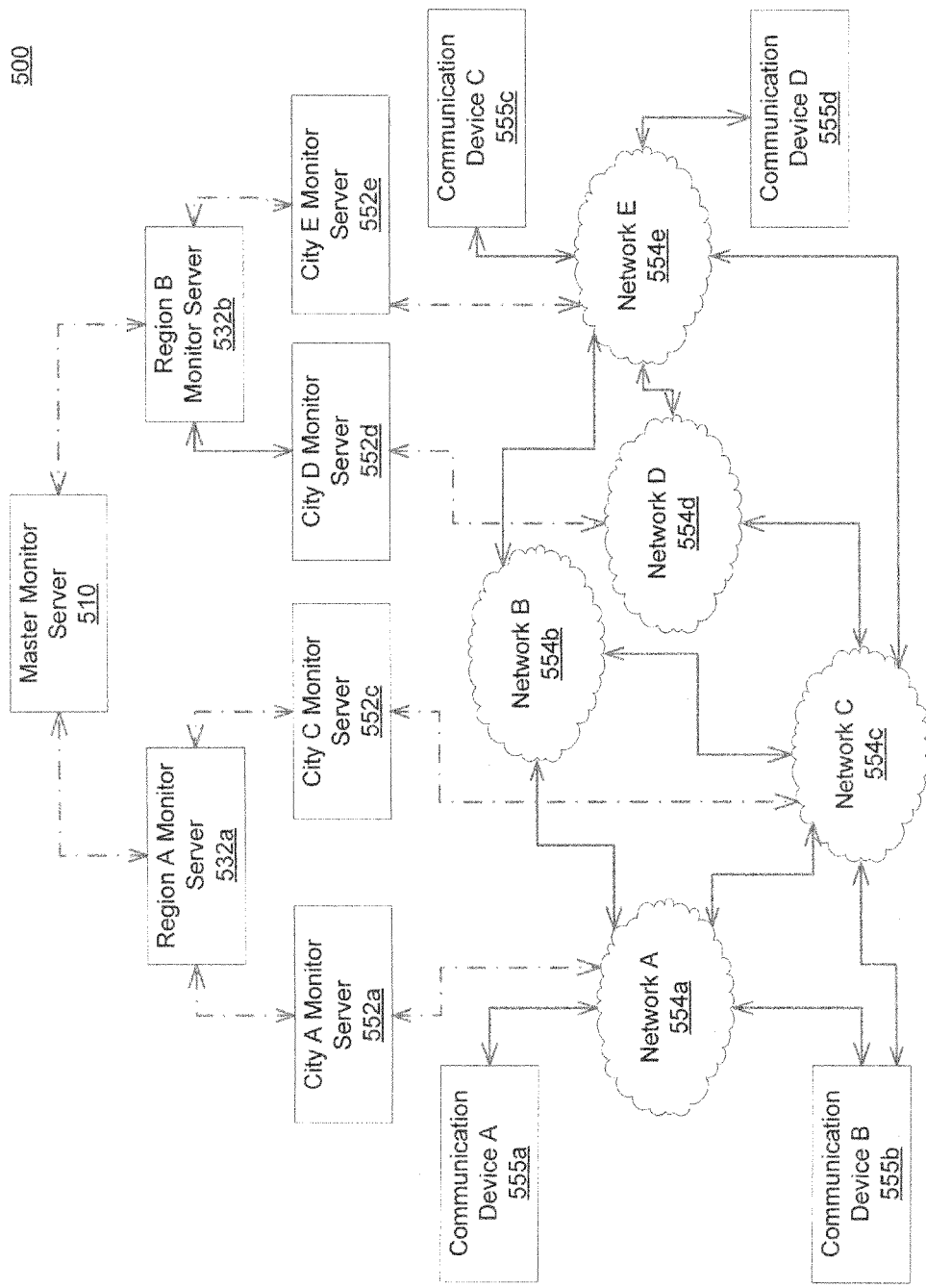
FIG. 5 is a block diagram of another exemplary system for monitoring a network.

FIG. 5 is a block diagram of another exemplary system 500 for monitoring a network. The system 500 includes a master monitor server 510, a region A monitor server 532a, a region B monitor server 532B, a city A monitor server 552a, a city C monitor server 552c, a city D monitor server 552d, and a city E monitor server 552e. The system 500 further includes a communication device A 555a, a communication device B 555b, a communication device C 555c, and a communication device D 555d (referred to as communication devices 555). The system 500 further includes a network A 554a, a network B 554b, a network C 554c, a network D 554d, and a network E 554e (referred to as networks 554). The communication devices 555 communicate with each other via the networks 554. The respective city monitor servers 552 monitor network transmissions between the communication devices 555.

In some examples, a server (not shown) transmits multicast network transmissions to a plurality of communication devices 555. For example, the server multicasts a video to the four communication devices 555. The respective city monitor servers 552 receive the network transmissions of the video (e g., control signals, data, etc.) and correlate the network transmissions to form the network transaction (e g., a combination of the multicast network transmissions to all of the communication devices, a combination of the multicast network transmissions to some of the communication devices, the multicast network transmissions to one of the communication devices, etc.).

Further examples of the communication between the communication devices 555 and/or the monitoring of the network transmissions between the communication devices 555 follow in the description of FIGS. 6A-B and 7A-B. The parts and/or components of the system 500 of FIG. 5 substantially correspond to the parts and/or components of the systems in FIGS. 6A-6B and 7A-7B. However, the descriptions of FIGS. 6A-6B and 7A-7B are exemplary in respect to FIG. 5.

Figure 6A:
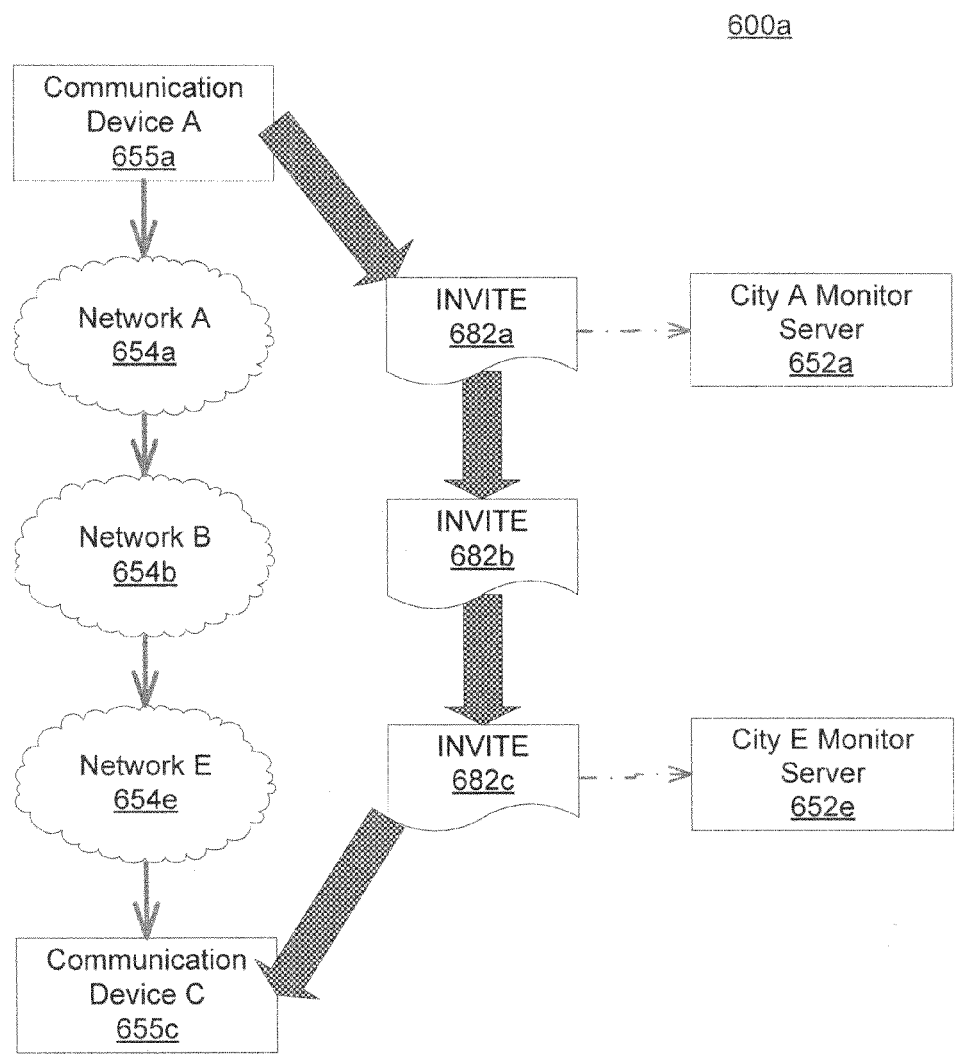
FIGS. 6A-6B are flow diagrams of other exemplary systems for monitoring a network.

FIG. 6A is a flow diagram of another exemplary system 600a for monitoring a network. The system 600a includes a communication device A 655a, a communication device C 655c, a city A monitor server 652a, and a city E monitor server 652e. The system 600a further includes a network A 654a, a network B 654b, and a network E 654e. The system 600a illustrate an Invite packet 682a, 682b, and 682c which is communicated via the networks A 654a, B 654b, and E 654e, respectively. Accordingly, the Invite packet 682a is received at city A monitor server 652a via monitoring of the network A 654a. The Invite packet 682c is received at the city E monitor server 652e via monitoring of the network E 654e.

As illustrated in FIGS. 5 and 6A, the network B 654b is not associated with a monitor server. As such, packets transmitted via the network B 654b are not monitored by the system 600a. However, in this exemplary system 600a, the Invite packet 682a and 682c is monitored on networks 654a and 654e and received at city A monitor server 652a and city E monitor server 652e.

Figure 6B:
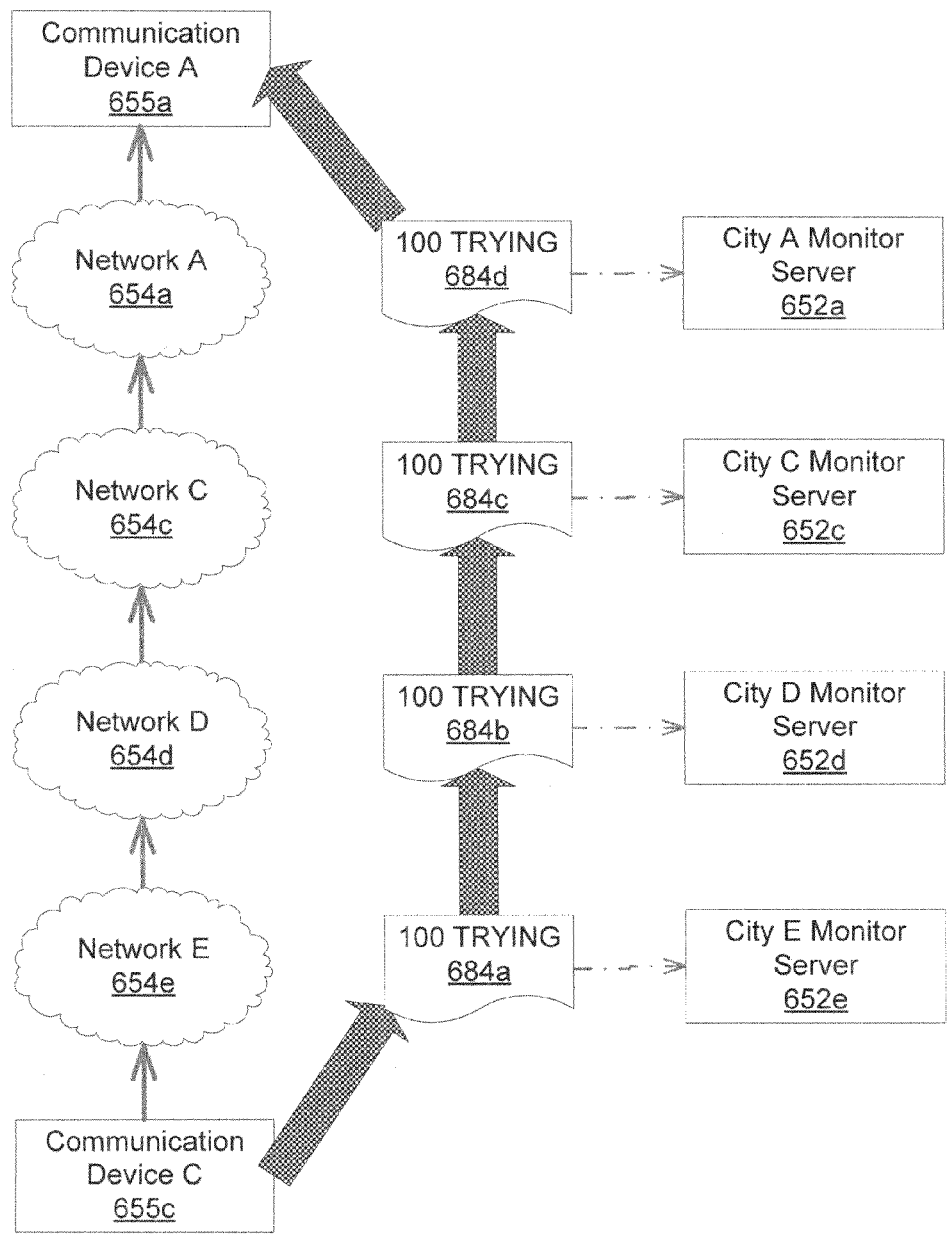

FIG. 6B is a flow diagram of another exemplary system 600b for monitoring a network. The system 600b includes a communication device A 655a, a communication device C 655c, a city A monitor server 652a, a city C monitor server 652c, a city D monitor server 652d, and a city E monitor server 652e. The system 600b further includes a network A 654a, a network C 654c, a network D 654d, and a network E 654e. The system 600b illustrates an exemplary 100 Trying packet 684a, 684b, 684c, and 684d transmitted via the networks E 654e, D 654d, C 654c, and A 654a, respectively. In other words, the communication device C 655c communicates the 100 Trying packet to the communication device A 655a via the networks E 654e, D 654d, C 654c, and A 654a. The 100 Trying packet 684a, 684b, 684c, and 684d is monitored via the respective networks E 654e, D 654d, C 654c, and A 654a by the city E monitor server 652e, the city D monitor server 652d, the city C monitor server 652c, and the city A monitor server 652a, respectively. The city E monitor server 652e, the city D monitor server 652d, the city C monitor server 652c, and the city A monitor server 652a receive the 100 Trying packet 684a, 684b, 684c, and 684d, respectively.

As a further example of FIGS. 5 and 6B, each of the city monitor servers 552a, 552c, 552d, and 552e correlate the received network transmissions and transmit the correlated network transaction to the region monitor server 532a and 532b in its group. In this example, the city monitor servers 552a and 552c are grouped together with the region monitor server 532a and the city monitor servers 552d and 552e are grouped together with the region monitor server 532b. Each of the region monitor servers 532a and 532b correlate the received correlated network transactions and/or any received network transmissions to form a second correlated network transaction. Each of the region monitor servers 532a and 532b transmits the second correlated network transaction to the master monitor server 510. The master monitor server 510 correlates the received second correlated network transactions to form a final correlated network transaction (e.g., complete network transaction, incomplete network transaction that is fully correlated, incomplete network transaction that exceeds a maximum correlation time, etc.) and stores the final correlated network transaction.

Although FIG. 6B illustrates a network transmission (in this example, a packet) transmitted via a certain network path (in this example, the networks E 654e, D 654d, C 654c, and A 654a), the network transmission can utilize, for example, any network path between the communication devices C 655c and A 655a. For example, as an alternative network path, the network transmission is transmitted via the networks E 654e, B 654b, and A 654a.

Figure 7A:
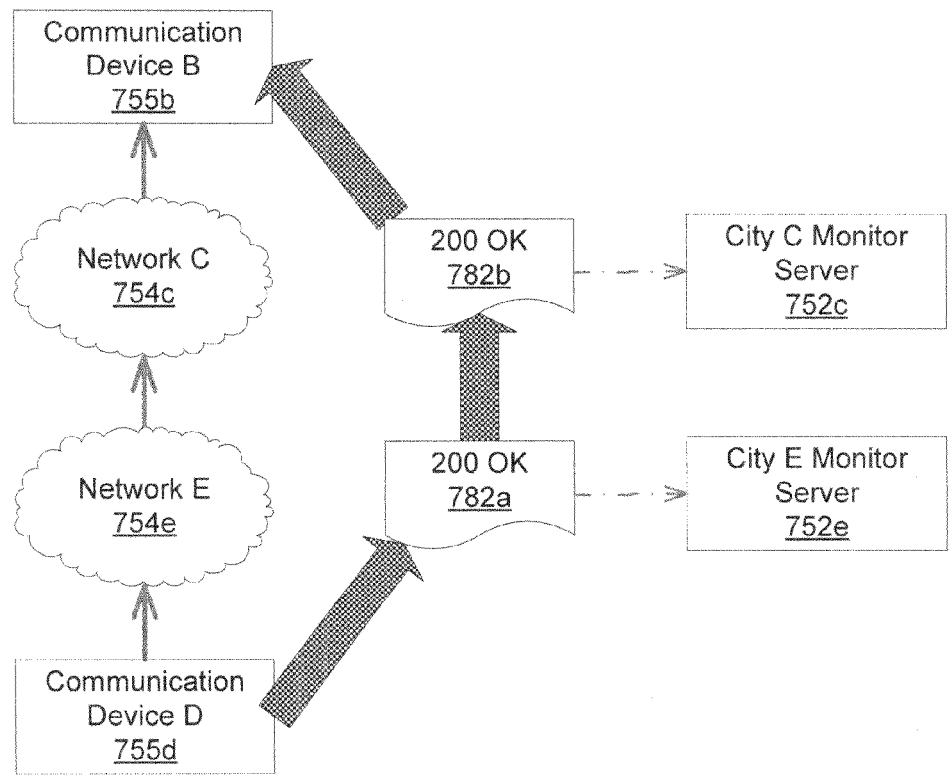
FIGS. 7A-7B are flow diagrams of other exemplary systems for monitoring a network.

FIG. 7A is a flow diagram of another exemplary system 700a for monitoring a network. The system 700a includes a communication device B 755b, a communication device D 755d, a city C monitor server 752c, and a city E monitor server 752e. The system 700a further includes a network E 754e and a network C 754c. The system 700a illustrates the communication of a 200 OK packet 782a and 782b from the communication device D 755d to the communication device B 755b via the networks E 754e and C 754c, respectively. The city E monitor server 752e receives the 200 OK packet 782a as the packet is transmitted via the network E 754e. The city C monitor server 752c monitors the network C 754c and receives the 200 OK packet 782b as the packet is transmitted via the network C 754c.

Figure 7B:
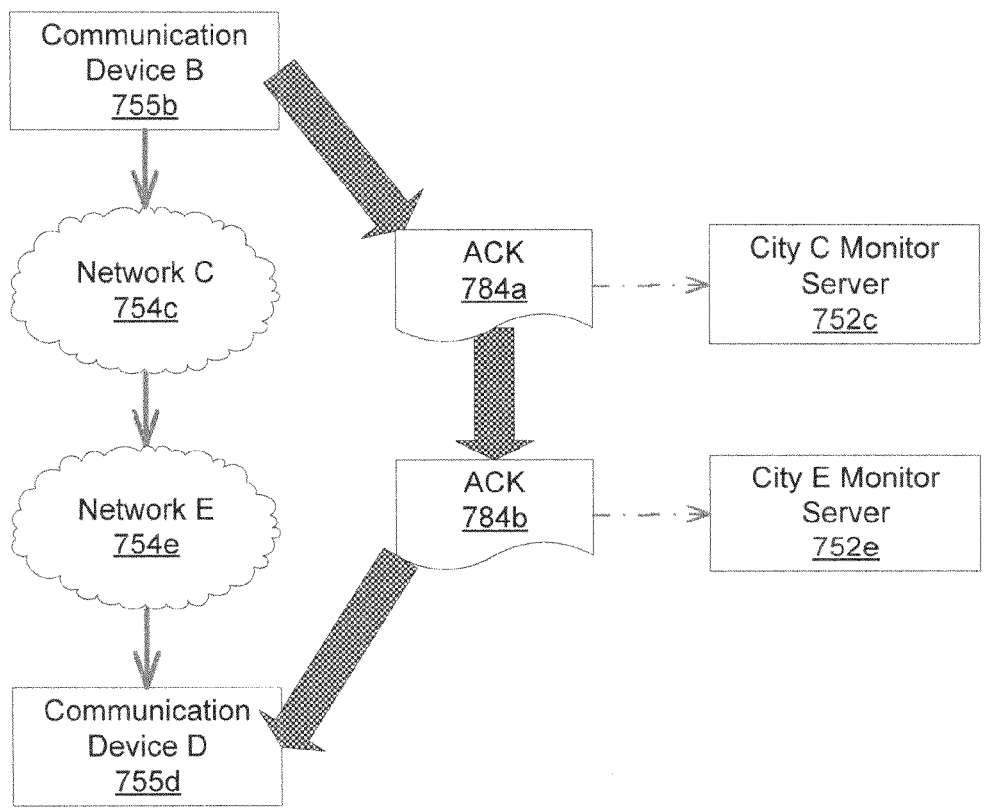

FIG. 7B is a flow diagram of another exemplary system 700b for monitoring a network. The system 700b includes a communication device B 755b, a communication device D 755d, a city C monitor server 752c, and a city E monitor server 752e. The system 700b further includes a network C 754c and a network E 754e. The system 700b illustrates an ACK packet 784a and 784b. The city C monitor server 752c monitors the network C 784c and receives the ACK packet 784a as the packet is transmitted via the network C 784c. The city E monitor server 752e monitors the network E 754e and receives the ACK packet 784b as the packet is transmitted via the network E 754e.

FIG. 8A illustrates received signaling data 800a from an exemplary system 100 of FIG. 1. The received signaling data 800a includes three packets identified as A, B, and C. The three packets A, B, and C are received (e.g., captured by, forwarded to, etc.) at three different monitor servers, 10.10.10.1, 192.168.4.2, and 10.30.30.1. Each of the three monitor servers correlate the received packets with other network transmissions to form a correlated network transaction. In this example, the correlated network transaction at each monitor server is just the single packet (i.e., an INVITE request in a session initiation protocol). Each of the three monitor servers transmits the correlated network transaction to a master monitor server (not shown). The master monitor server correlates the received network transactions from the three monitor servers. The correlation by the master monitor server includes grouping packets together and/or removing redundant information. Table 1 illustrates the correlation of the packets by the master monitor server into a correlated network transaction T1.

TABLE 1

Exemplary Correlated Network Transaction.

| Identifier | Source | Destination | Capture | Packet |
|---|---|---|---|---|
| T1 | 10.10.10.10 | 10.30.30.30 | 10.10.10.1; 192.168.4.2; 10.30.30.1 | INVITE |

Although FIG. 8A illustrates only four parameters for the received signaling data 800a, the received signaling data 800a can include any number of parameters (e.g., timestamps, packet number, etc.), payload information (e.g., payload size, payload cyclic redundancy check, etc.) and/or the payload of the network transmission. For example, the received signaling data 800a includes the timestamps for each packet and the timestamps are utilized to correlate the network transmissions into a correlated network transaction. In this example, the correlated network transaction can include the timestamps for use in determining network performance metrics and/or modifications to the network configuration based on the network performance metrics and/or the timestamps (e.g., high latency, high jitter, etc.).

FIG. 8B illustrates received signaling data 800b from an exemplary system 100 of FIG. 1. The received signaling data 800b includes three packets identified as A, B, and C. The three packets A, B, and C are received (e.g., captured by, forwarded to, etc.) at three different monitor servers, 192.168.4.2, 192.168.6.6, and 10.30.30.1. Each of the three monitor servers correlate the received packets with other network transmissions to form a correlated network transaction. In this example, the correlated network transaction at each monitor server is just the single packet A, B, or C. Each of the three monitor servers transmits the correlated network transaction to a master monitor server (not shown). The master monitor server correlates the received network transactions from the three monitor servers. The correlation by the master monitor server includes grouping packets together, removing redundant information, analyzing the packet types, and/or analyzing the timestamps. Table 2 illustrates the correlation of the packets by the master monitor server into correlated network transactions T1 and T2.

TABLE 2

Exemplary Correlated Network Transaction.

| Identifier | Source | Destination | Capture | Packet | Time Stamps |
|---|---|---|---|---|---|
| T1 | 10.10.10.10 | 10.30.30.30 | 192.168.4.2; 10.30.30.1 | INVITE; ACK | 02:16:57; 02:18:57 |
| T2 | 10.30.30.30 | 10.10.10.10 | 192.168.6.6 | OK | 02:17:57 |

In some examples, the master monitor server and/or any other third-party network management server can utilize the correlated network transactions T1 and T2 to determine a network performance metric (e.g., quality of service metric, quality of experience metric, dropped packets, delay, jitter, out-of-order delivery, error, dedicated bandwidth delivery, etc.). For example, the master monitor server determines that the network performance metric of the delay of one second between the INVITE and OK packets and the OK and ACK packets is delay=one second. Based on this delay of one second and/or the type of the network transaction (e.g., VoIP call, video call, etc.), the master monitor server increases the dedicated bandwidth for this type of network transactions between the source communication device and the destination communication device. In other words, the master monitor server can modify one or more network configuration parameters to change the communication of network transmissions and/or network transactions on the network (e.g., set a quality of service parameter on the network service, modify the routing protocol to avoid congested networks, etc.).

In other examples, the master monitor server and/or any other third-party network management server can utilize the correlated network transaction T1 and T2 to generate a report of the network performance metric and/or any other information associated with the network (e.g., real-time data types transmitted via the network, real-time network transmissions, etc.). A display device associated with the master monitor server and/or the third-party network management server can display the report.

Although Table 2 illustrates the correlation of the packets A, B, and C into two network transactions T1 and T2, in other examples, the master monitor server correlates the packets A, B, and C into one network transaction T1' as illustrated in Table 3.

TABLE 3

Exemplary Correlated Network Transaction.

| Identifier | Communication Devices | Packet | Time Stamps |
|---|---|---|---|
| T1' | 10.10.10.10; 10.30.30.30 | INVITE; OK; ACK | 02:16:57; 2:17:57; 02:18:57 |

FIG. 8C illustrates received signaling data 800c from an exemplary system 100 of FIG. 1. The received signaling data 800c includes five packets identified as A, B, C, D, and E. The five packets A, B, C, D, and E are received at five different monitor servers, 192.168.4.2, 192.168.3.2, 192.168.6.6, 10.10.10.1, and 10.30.30.1. Each of the five monitor servers correlate the received packets with other network transmissions to form a correlated network transaction. In this example, the correlated network transaction at each monitor server is just the single packet A, B, C, D, or E. Each of the five monitor servers transmits the correlated network transaction to a master monitor server (not shown). The master monitor server correlates the received network transactions from the five monitor servers. The correlation by the master monitor server includes grouping packets together, removing redundant information, analyzing the packet types, analyzing the timestamps, and/or any other type of filtering and/or separating of the network transmissions. Table 4 illustrates the correlation of the packets by the master monitor server into correlated network transaction T1.

TABLE 4

Exemplary Correlated Network Transaction.

| Identifier | Communication Devices | Relative Time | Packet |
|---|---|---|---|
| T1 | 10.10.10.10; 10.30.30.30 | 00:00.00; 00:00.94; 00:04.34 | INVITE; OK; BYE |

FIG. 8D illustrates received signaling data 800d from an exemplary system 100 of FIG. 1. The received signaling data 800d includes three packets identified as A, B, and C. The three packets A, B, and C are received (e.g., captured by, forwarded to, etc.) at three different monitor servers, 10.10.10.1, 192.168.4.2, and 10.30.30.1. Each of the three monitor servers correlate the received packets with other network transmissions to form a correlated network transaction. In this example, the correlated network transaction at each monitor server is just the single packet (i.e., a PLAY request in a real-time streaming protocol). Each of the three monitor servers transmits the correlated network transaction to a master monitor server (not shown). The master monitor server correlates the received network transactions from the three monitor servers. The correlation by the master monitor server includes grouping packets together and/or removing redundant information. Table 5 illustrates the correlation of the packets by the master monitor server into a correlated network transaction T1.

TABLE 5

Exemplary Correlated Network Transaction.

| Identifier | Source | Destination | Capture | Packet |
|---|---|---|---|---|
| T1 | 10.10.10.10 | 10.30.30.30 | 10.10.10.1; 192.168.4.2; 10.30.30.1 | PLAY |

FIG. 8E illustrates received signaling data 800e from an exemplary system 100 of FIG. 1. The received signaling data 800e includes three packets identified as A, B, and C. The three packets A, B, and C are received (e.g., captured by, forwarded to, etc.) at three different monitor servers, 192.168.4.2, 192.168.6.6, and 10.30.30.1. Each of the three monitor servers correlate the received packets with other network transmissions to form a correlated network transaction. In this example, the correlated network transaction at each monitor server is just the single packet A, B, or C. Each of the three monitor servers transmits the correlated network transaction to a master monitor server (not shown). The master monitor server correlates the received network transactions from the three monitor servers. The correlation by the master monitor server includes grouping packets together, removing redundant information, analyzing the packet types, and/or analyzing the timestamps. Table 6 illustrates the correlation of the packets by the master monitor server into correlated network transactions T1 and T2.

TABLE 6

Exemplary Correlated Network Transaction.

| Identifier | Source | Destination | Capture | Packet | Time Stamps |
|---|---|---|---|---|---|
| T1 | 10.10.10.10 | 10.30.30.30 | 192.168.4.2; 10.30.30.1 | SETUP; PLAY | 02:16:57; 02:19:27 |
| T2 | 10.30.30.30 | 10.10.10.10 | 192.168.6.6 | OK | 02:18:57 |

In some examples, the master monitor server and/or any other third-party network management server can utilize the correlated network transactions T1 and T2 to determine a network performance metric (e.g., quality of service metric, quality of experience metric, dropped packets, delay, jitter, out-of-order delivery, error, dedicated bandwidth delivery, etc.). For example, the master monitor server determines that the network performance metric of the delay of two seconds between the SETUP and OK packets is delay=two seconds. Based on this delay of two seconds and/or the type of the network transaction (e.g., VoIP call, video call, etc.), the master monitor server increases the dedicated bandwidth for this type of network transactions between the source communication device and the destination communication device. In other words, the master monitor server can modify one or more network configuration parameters to change the communication of network transmissions and/or network transactions on the network (e.g., set a quality of service parameter on the network service, modify the routing protocol to avoid congested networks, modify client buffer size, etc.).

In other examples, the master monitor server and/or any other third-party network management server can utilize the correlated network transaction T1 and T2 to generate a report of the network performance metric and/or any other information associated with the network (e.g., real-time data types transmitted via the network, real-time network transmissions, etc.). A display device associated with the master monitor server and/or the third-party network management server can display the report.

Although Table 6 illustrates the correlation of the packets A, B, and C into two network transactions T1 and T2, in other examples, the master monitor server correlates the packets A, B, and C into one network transaction T1' as illustrated in Table 7.

TABLE 7

Exemplary Correlated Network Transaction.

| Identifier | Communication Devices | Packet | Time Stamps |
|---|---|---|---|
| T1' | 10.10.10.10; 10.30.30.30 | SETUP; OK; PLAY | 02:16:57; 02:18:57; 02:17:27 |

FIG. 8F illustrates received signaling data 800f from an exemplary system 100 of FIG. 1. The received signaling data 800f includes five packets identified as A, B, C, D, and E. The five packets A, B, C, D, and E are received at five different monitor servers, 192.168.4.2, 192.168.3.2, 192.168.6.6, 10.10.10.1, and 10.30.30.1. Each of the five monitor servers correlate the received packets with other network transmissions to form a correlated network transaction. In this example, the correlated network transaction at each monitor server is just the single packet A, B, C, D, or E. Each of the five monitor servers transmits the correlated network transaction to a master monitor server (not shown). The master monitor server correlates the received network transactions from the five monitor servers. The correlation by the master monitor server includes grouping packets together, removing redundant information, analyzing the packet types, analyzing the timestamps, and or any other type of filtering and/or separating of the network transmissions. Table 8 illustrates the correlation of the packets by the master monitor server into correlated network transaction T1.

TABLE 8

Exemplary Correlated Network Transaction.

| Identifier | Communication Devices | Relative Time | Packet |
|---|---|---|---|
| T1 | 10.10.10.10; | 00:00.00; | SETUP; |
| | 10.30.30.30 | 00:00.24; | RECORD; |
| | | 02:54.34 | TEARDOWN |

FIG. 8G illustrates received signaling data 800g from an exemplary system 100 of FIG. 1. The received signaling data 800g includes thirteen packets identified as A through M (e.g., packets in real-time transport protocol, packets in stream control transmission protocol, packets in a voice transaction, packets in a video transaction, etc.). The thirteen packets A through M are received at five different monitor servers, 10.10.10.2, 10.30.30.2, 192.168.4.2, 192.168.2.2, and 10.50.50.2. Each of the five monitor servers correlate the received packets with other network transmissions to form a correlated network transaction. Table 9-13 illustrate the correlation of the packets at each of the monitor servers. Each of the five monitor servers transmits the correlated network transaction to a master monitor server (not shown). The master monitor server correlates the received network transactions from the five monitor servers. Table 14 illustrates the correlation of the correlated network transactions at the master monitor server.

TABLE 9

Exemplary Correlated Network Transaction at Monitor Server 10.10.10.2.

| Identifier | Source | Destination | Capture | Sequence No. |
|---|---|---|---|---|
| 10.10.10.2:T1 | 10.10.10.10 | 10.30.30.30 | 10.10.10.2 | 1000; 1002 |
| 10.10.10.2:T2 | 10.40.40.40 | 10.50.50.50 | 10.10.10.2 | 1000 |

TABLE 10

Exemplary Correlated Network Transaction at Monitor Server 10.30.30.2.

| Identifier | Source | Destination | Capture | Sequence No. |
|---|---|---|---|---|
| 10.30.30.2:T1 | 10.40.40.40 | 10.50.50.50 | 10.30.30.2 | 1000; 1004 |
| 10.30.30.2:T2 | 10.10.10.10 | 10.30.30.30 | 10.30.30.2 | 1002; 1004 |

TABLE 11

Exemplary Correlated Network Transaction at Monitor Server 192.168.4.2.

| Identifier | Source | Destination | Capture | Sequence No. |
|---|---|---|---|---|
| 192.168.4.2:T1 | 10.10.10.10 | 10.30.30.30 | 192.168.4.2 | 1000 |
| 192.168.4.2:T2 | 10.30.30.30 | 10.10.10.10 | 192.168.4.2 | 2000 |
| 192.168.4.2:T3 | 10.30.30.30 | 10.50.50.50 | 192.168.4.2 | 2000 |

TABLE 12

Exemplary Correlated Network Transaction at Monitor Server 192.168.2.2.

| Identifier | Source | Destination | Capture | Sequence No. |
|---|---|---|---|---|
| 192.168.2.2:T1 | 10.10.10.10 | 10.30.30.30 | 192.168.2.2 | 1004 |
| 192.168.2.2:T2 | 10.30.30.30 | 10.10.10.10 | 192.168.2.2 | 2000 |

TABLE 13

Exemplary Correlated Network Transaction at Monitor Server 10.50.50.2.

| Identifier | Source | Destination | Capture | Sequence No. |
|---|---|---|---|---|
| 10.50.50.2:T1 | 10.30.30.30 | 10.10.10.10 | 10.50.50.2 | 2000 |

TABLE 14

Exemplary Correlated Network Transaction at Master Monitor Server.

| Identifier | Source | Destination | Capture | Sequence No. |
|---|---|---|---|---|
| Master:T1 | 10.10.10.10 | 10.30.30.30 | 10.10.10.2; 10.30.30.2; 192.168.4.2; 192.168.2.2 | 1000; 1002; 1004 |
| Master:T2 | 10.40.40.40 | 10.50.50.50 | 10.10.10.2; 10.30.30.2 | 1000; 1004 |
| Master:T3 | 10.30.30.30 | 10.10.10.10 | 192.168.4.2; 192.168.2.2; 10.50.50.2 | 2000 |
| Master:T4 | 10.30.30.30 | 10.50.50.50 | 192.168.4.2 | 2000 |

In other examples, the correlated network transactions Master:T1 and Master:T3, as illustrated in Table 14, are correlated together since the communication devices are the respective source and destination for each transaction.

Figure 9:
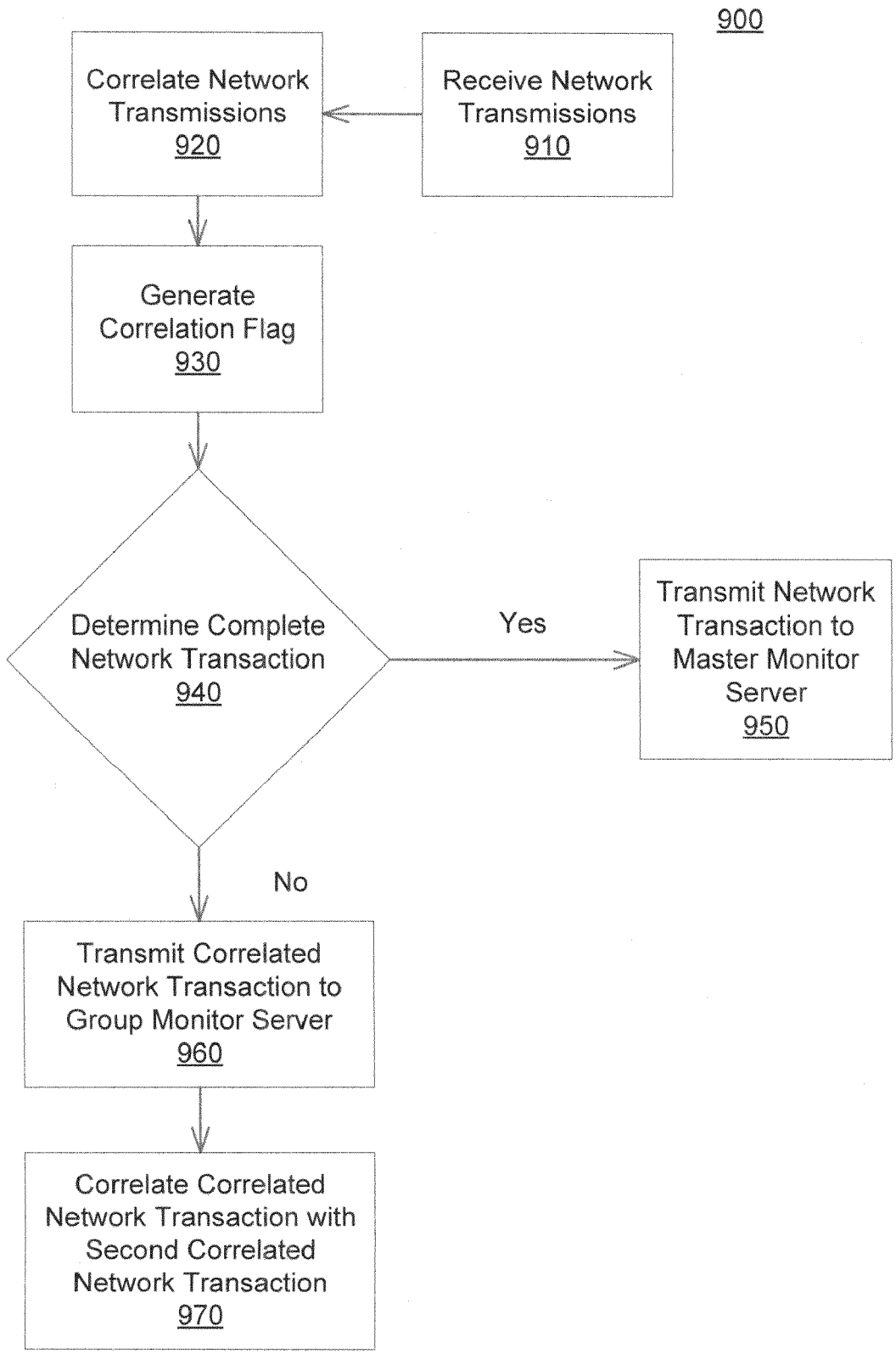
FIG. 9 is an exemplary flow chart of the correlation of network transmissions.

FIG. 9 is an exemplary flow chart 900 of the correlation of network transmissions via the monitor server 410 on FIG. 4. The communication module 412 receives (910) network transmissions from one or networks. The correlation module 416 correlates (920) the network transmissions to form a correlated network transaction. The correlation module 416 generates (930) a correlation flag based on the correlated network transaction and/or other information associated with the network transmissions and/or the correlated network transaction. The correlation module 416 determines (940) whether the correlated network transaction is a complete network transaction based on the correlation flag. If the correlated network transaction is a complete network transaction, the communication module 412 transmits (950) the correlated network transaction to a master monitor server. If the correlated network transaction is not a complete network transaction, the communication module 412 transmits (960)

the correlate network transaction to a group monitor server. The group monitor server correlates (970) the correlate network transaction with a second correlate network transaction and/or other network transmissions to form a third correlated network transaction.

In some examples, the group monitor server transmits the third correlated network transaction to the master monitor server. The transmission of the third correlated network transaction can be, for example, based on a second correlation flag which is generated by the group monitor server.

Figure 10:
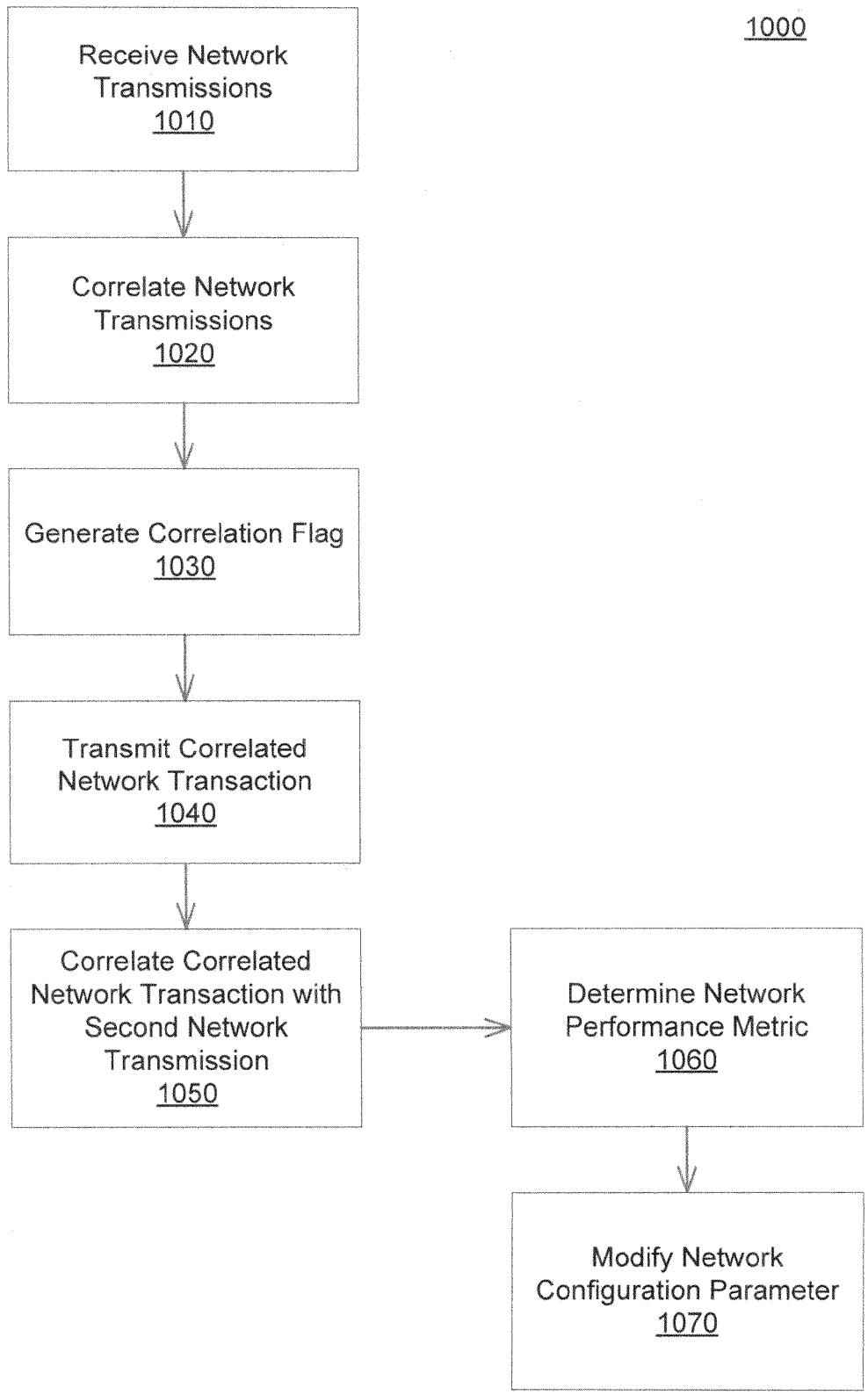
FIG. 10 is another exemplary flow chart of the correlation of network transmissions.

FIG. 10 is another exemplary flow chart 1000 of the correlation of network transactions via the monitor server 410 on FIG. 4. The communication module 412 receives (1010) a plurality of network transmissions. The correlation module 416 correlates (1020) the network transmissions to form a correlated network transaction. The correlation module 416 generates (1030) a correlation flag based on the correlated network transaction. The communication module 412 transmits (1040) the correlated network transaction to a second communication module (not shown). A second correlation module (not shown) correlates (1050) the correlated network transaction with a second network transmission to form a second correlated network transaction. A second network control module (not shown) determines (1060) a network performance metric based on the second correlated network transaction. The network control module modifies (1070) a network configuration parameter based on the network performance metric.

Figure 11:
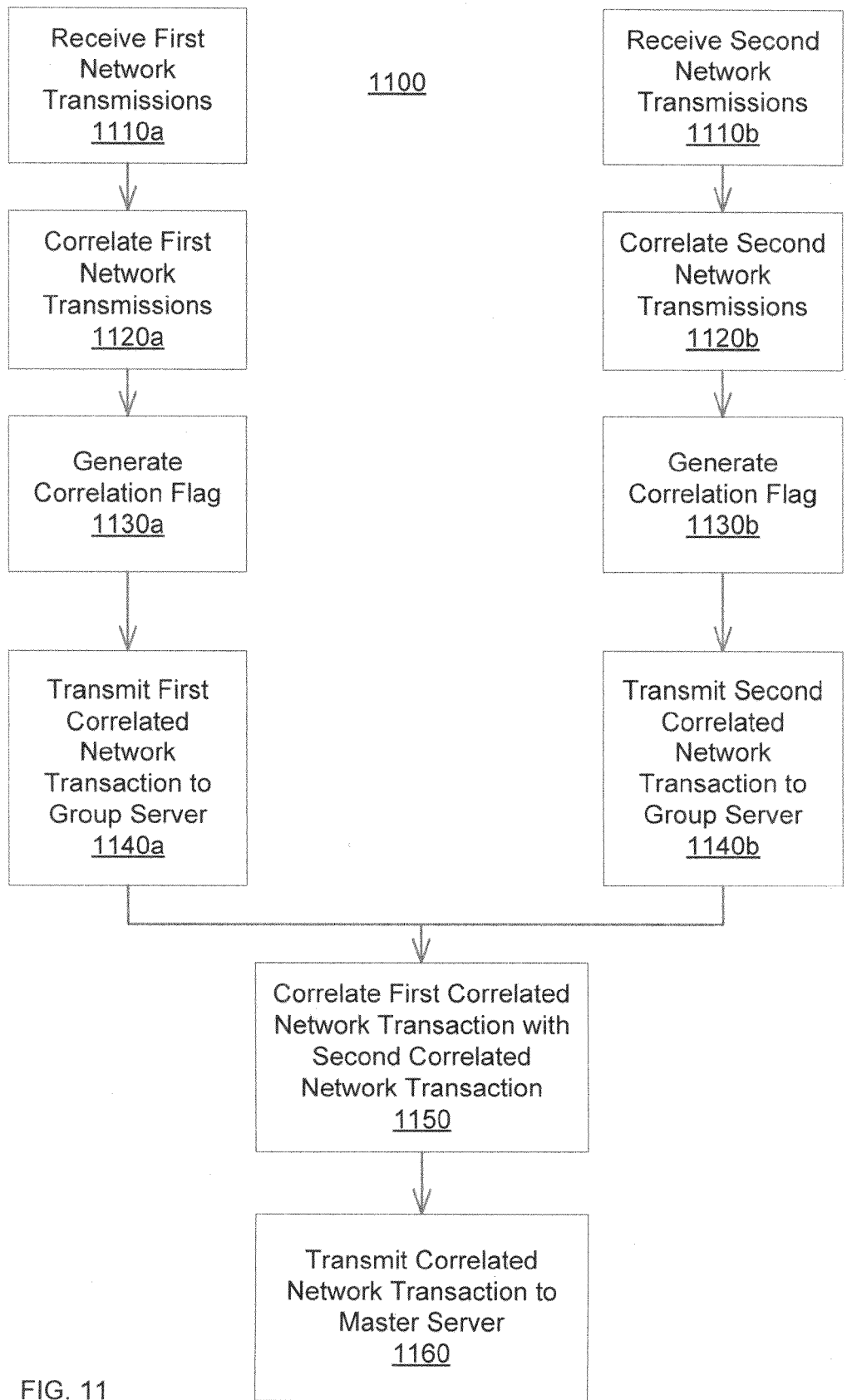
FIG. 11 is another exemplary flow chart of the correlation of network transmissions.

FIG. 11 is another exemplary flow chart 1100 of the correlation of a network transaction through the system 300 of FIG. 3. The sub-group A monitor server 352*a* receives (1110*a*) first network transmissions. The sub-group A monitor server 352*a* correlates (1120*a*) the first network transmissions to form a first correlated network transaction and generates (1130*a*) a first correlation flag based on the correlated network transaction. The sub-group A monitor server 352*a* transmits (1140*a*) the first correlated network transaction to the group monitor server 332 based on the first correlation flag. The sub-group B monitor server 352*b* receives (1110*b*) second network transmissions and correlates (1120*b*) the second network transmissions to form a second correlated network transaction. The sub-group B monitor server 352*b* generates (1130*b*) a second correlation flag based on the second correlated network transaction and transmits (1140*b*) the second correlated transaction to the group monitor server 332 based on the second correlation flag. The group monitor server 332 correlates (1150) the first correlated network transaction with the second correlated network transaction to form a third correlated network transaction. The group monitor server 332 transmits (1160) the third correlated network transaction to the master server 310.

In some examples, the communication devices are split into monitor groups and a single communication device in each monitor group is designated as the group's server (i.e., the monitor server) via a pre-determined designation and/or a dynamically determined designation. The other communication devices in the monitor group can be termed clients. The monitor server can be a communication device that is designated as the monitor server.

In other examples, the monitor server can be a device that does not act as a communication device. The monitor server can be, for example, integrated into another device (e.g., a gateway, a firewall, etc.) and/or a separate stand-alone device on the network (e.g., the monitor server connected to a shadow port on the gateway, the monitor server as a pass-through for all network transmissions, etc.). In other words, in some examples, the monitor server is a separate stand-alone device on the network that receives all of the network transmissions transmitted via the network.

In some examples, information for each partial network transaction that can be detected is passed from the client, i.e., the communication device, to the monitor server. The information for each partial network transaction can include enough information to allow the monitor server to identify the network transactions uniquely across the network.

In some examples, if a transaction is detected by monitor servers in different groups, the monitor server for each group will still only have partial information for that transaction. Thus, the monitoring groups are formed into a hierarchical structure. Each monitor server can in turn act as a client to another monitor server, if itself collects only partial information for a transaction. The master server can be looked at as the root node of a tree. Each device and/or server can be configured as either client only, client/monitor server, and/or master monitor server. The structure of the hierarchical tree can take any shape or form and/or can be dynamically configurable. The tree of monitoring devices and/or monitor groups can be tailored to match the organization of the network to be monitored (e.g., geographically, business organization, network usage, etc.).

Although FIG. 1 illustrates the system 100 in a hierarchical configuration, as described above, the system 100 can be in any configuration and/or reporting setup. For example, the system 100 can include two master monitor servers for redundancy and backup and each monitor group transmits the network transactions (e.g., correlated, uncorrelated, etc.) to both master monitor servers. As another example, a monitor group can be a member of multiple higher monitor group (e.g., office that cross geographically split monitor groups, offices that include devices assigned to multiple organizational units, etc.). In other words, in this example, the monitor sub-group Z 150*z* is a member of both the monitor group A 130*a* and the monitor group B 130*b* and transmits the network transactions (e.g., correlated, uncorrelated, etc.) to both monitor groups A 130*a* and B 130*b*. As a further example, a monitor group and/or a device can send correlated network transactions (e.g., fully correlated transactions, substantially correlated transactions, partially correlated transactions, etc.) to a first master monitor server and/or a first monitor group and other network transaction information (e.g., uncorrelated network transaction, network transmissions, etc.) to a second master monitor server and/or a second monitor group. In other words, in this example, the monitor group and/or the device can determine where to transmit data (e.g., correlated network transaction, uncorrelated network transaction, network transmissions, etc.) to and transmit the data to the determined device and/or server accordingly.

In other examples, the network transmissions include call signaling (e.g., signaling to create a telephone call, signaling to tear down a video call, etc.), a data packet, a voice communication packet (e.g., a packet that includes audio, a packet that includes audio metadata, etc.), a session initiation packet (SIP), a transmission control protocol (TCP) packet, an internet protocol (IP) packet, a voice over internet protocol (VoIP) packet, a real-time transport protocol (RTP) packet, and/or any other type of packet, signal, and/or transmission (e.g., a H.323 packet, a network-based call signaling (NCS) packet, etc.).

In some examples, the information associated with the network transmissions is a session initiation protocol (SIP), a transmission control protocol (TCP), an internet protocol (IP), a voice over internet protocol (VoIP), a real-time transport protocol (RTP), a RTP control protocol (RTCP), a secure real-time transport protocol (SRTP), and/or any other type of protocol. The information associated with the protocols can include, for example, protocol information associated with types of network transmissions (e.g., ACK, HELLO, PLAY, TEARDOWN, etc.), protocol information associated with the composition and/or format of the network transmission (e.g., sequence numbers, time stamps, etc.), and/or any other type of protocol information. The information associated with the network transmission can be, for example, recipient information (e.g., recipient device, recipient network, etc.), transmitter information (e.g., transmitter device, transmitter network, etc.), network information (e.g., intermediate network, network connections, etc.), and/or any other type of information associated with the network.

For example, the group monitor server 232 correlates the received network transmissions based on the recipient information and the transmitter information of the network transmissions. In other words, the group monitor server 232 identifies that the recipient network address and the transmitter network address for the received network transmissions match and are grouped together.

In other examples, the group monitor server 232 can remove redundant information (e.g., recipient information, transmitter information, network information, etc.) and/or information not needed for performance processing from the correlated network transaction (e.g., packet payload, acknowledgement packets, etc.). For example, the recipient information and the transmitter information are removed from the correlated network transaction to reduce to the size and complexity of the correlated network transaction. In this example, the recipient information and the transmitter information is retained once in the header (e.g., separate part, beginning, etc.) of the correlated network transaction.

In some examples, the correlation flag can, for example, indicate that the correlated network transaction is a complete network transaction (e.g., includes all of the network transmissions, includes all of the network transmissions needed to determine a network performance metric, the group monitor server 232 of FIG. 2 is in position to monitor all of the network transmissions, etc.). For example, the phone 235a communicates with the computer 235c via the network 234. The group monitor server 232 receives the network transmissions between the phone 235a and the computer 235c. In this example, the group monitor server 232 can correlate the received network transmissions to form a complete network transaction since all of the network transmissions between the phone 235a and the computer 235c were monitored solely by the group monitor server 232.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a field programmable gate array (FPGA) and/or an application-specific integrated circuit (ASIC). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The communication device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for correlating network transactions, comprising:
    receiving, at a first monitor server, a first plurality of call control signaling transmissions from a first plurality of communication networks;
    correlating, at the first monitor server, the first plurality of call control signaling transmissions based on protocol information associated with the first plurality of call control signaling transmissions to form a first correlated network transaction, wherein the correlating the first plurality of call control signaling transmissions comprising at least one of grouping one or more of the first plurality of call control signaling transmissions together based on associations of the protocol information and removing redundant information from the first plurality of call control signaling transmissions based on associations of the protocol information;
    determining a first correlation flag for the first correlated network transaction, wherein the correlation flag indicating that the first correlated network transaction comprises a complete network transaction or an incomplete network transaction;
    transmitting the first correlated network transaction from the first monitor server to a second monitor server based on if the first correlation flag indicates that the first correlated network transaction is an incomplete network transaction;
    transmitting the first correlated network transaction from the first monitor server to a master monitor server based on if the first correlation flag indicates that the first correlated network transaction is a complete network transaction; and
    correlating, at the second monitor server and if the first correlation flag indicates that the first correlated network transaction is an incomplete network transaction, the first correlated network transaction with a second call control signaling transmission based on at least one of the first correlation flag, information associated with the second call control signaling transmission, and information associated with the first correlated network transaction to form a second correlated network transaction, wherein the correlating the first correlated network transaction comprising at least one of grouping one or more parts of the first correlated network transaction and the second call control signaling transmission together based on associations of the protocol information and removing redundant information from the first correlated network transaction and the second call control signaling transmission based on associations of the protocol information.

2. The method of claim 1, further comprising determining a network performance metric based on the second correlated network transaction.

3. The method of claim 2, further comprising modifying a network configuration parameter based on the network performance metric.

4. The method of claim 1, wherein the first correlated network transaction is different from the second correlated network transaction.

5. The method of claim 1, wherein the second correlated network transaction comprises a portion of the first correlated network transaction.

6. The method of claim 1, wherein the first plurality of call control signaling transmissions are associated with a voice transaction, a video transaction, or any combination thereof.

7. The method of claim 1, further comprising generating, at the first monitor server, the first correlation flag based on at least one of the first correlated network transaction and information associated with a network transaction.

8. The method of claim 7, further comprising determining, at the first monitor server, if the first correlated network transaction is a complete network transaction.

9. The method of claim 1, further comprising:
    receiving, at a third monitor server, a third plurality of call control signaling transmissions from a third plurality of communication networks;
    correlating, at the third monitor server, the third plurality of call control signaling transmissions based on information associated with the third plurality of call control signaling transmissions to form a third correlated network transaction;
    determining a third correlation flag for the third correlated network transaction, wherein the third correlation flag indicating that the third correlated network transaction comprises a complete network transaction or an incomplete network transaction;
    communicating the third correlated network transaction from the third monitor server to the second monitor server based on if the third correlation flag indicates that the third correlated network transaction is an incomplete network transaction; and transmitting the third correlated network transaction from the third monitor server to the master monitor server based on if the third correlation flag indicates that the third correlated network transaction is a complete network transaction.

10. The method of claim 9, further comprising correlating, at the second monitor server and if the third correlation flag indicates that the third correlated network transaction is an incomplete network transaction, the first correlated network transaction, the second call control signaling transmission, and the third correlated network transaction based on at least one of the first correlation flag, the third correlation flag, information associated with the second call control signaling transmission, information associated with the first correlated network transaction, and information associated with the third correlated network transaction to form a network transaction.

11. The method of claim 9, wherein at least a portion of the first plurality of call control signaling transmissions being same as at least a portion of the second plurality of call control signaling transmissions.

12. The method of claim 1, wherein the information associated with the first correlated network transaction comprises a session initiation protocol, a transmission control protocol an internet protocol, a voice over internet protocol, a real-time transport protocol, or any combination thereof.

13. The method of claim 1, wherein the information associated with the first plurality of call control signaling transmissions comprises recipient information, transmitter information, network information, and/or any combination thereof.

14. The method of claim 1, further comprising monitoring, at the first monitor server, the first plurality of communication networks for the first plurality of call control signaling transmissions.

15. The method of claim 1, wherein at least one of the first plurality of communication networks is associated with a transmitter of a network transmission and at least one other of the first plurality of communication networks is associated with a recipient of the network transmission.

16. The method of claim 1, further comprising transmitting the second correlated network transaction from the second monitor server to the master monitor server.

17. A computer program product, tangibly embodied in a computer readable medium, the computer program product including instructions being operable to cause a data processing apparatus to:
receive a first plurality of call control signaling transmissions from a first plurality of communication networks;
correlate the first plurality of call control signaling transmissions based on protocol information associated with the first plurality of call control signaling transmissions to form a first correlated network transaction, wherein the correlate the first plurality of call control signaling transmissions comprising at least one of group one or more of the first plurality of call control signaling transmissions together based on associations of the protocol information and remove redundant information from the first plurality of call control signaling transmissions based on associations of the protocol information;
determine a first correlation flag for the first correlated network transaction, wherein the correlation flag indicating that the first correlated network transaction comprises a complete network transaction or an incomplete network transaction;
transmit the first correlated network transaction from a first monitor server to a second monitor server based on if the first correlation flag indicates that the first correlated network transaction is an incomplete network transaction;
transmitting the first correlated network transaction from the first monitor server to a master monitor server based on if the first correlation flag indicates that the first correlated network transaction is a complete network transaction; and
correlate, if the first correlation flag indicates that the first correlated network transaction is an incomplete network transaction, the first correlated network transaction with a second call control signaling transmission based on at least one of the first correlation flag, information associated with the second call control signaling transmission, and information associated with the first correlated network transaction to form a second correlated network transaction, wherein the correlate the first correlated network transaction comprising at least one of grouping one or more parts of the first correlated network transaction and the second call control signaling transmission together based on associations of the protocol information and removing redundant information from the first correlated network transaction and the second call control signaling transmission based on associations of the protocol information.

18. An apparatus for correlating network transactions comprising:
a first communication module configured to:
receive a first plurality of call control signaling transmissions from a first plurality of communication networks;
transmit a first correlated network transaction from the first communication module to a second communication module based on if the first correlation flag indicates that the first correlated network transaction is an incomplete network transaction; and
transmit the first correlated network transaction from the first communication module to a master communication module based on if the first correlation flag indicates that the first correlated network transaction is a complete network transaction;
a first correlation module configured to:
correlate the first plurality of call control signaling transmissions based on protocol information associated with the first plurality of call control signaling transmissions to form the first correlated network transaction, wherein the correlate the first plurality of call control signaling transmissions comprising at least one of group one or more of the first plurality of call control signaling transmissions together based on associations of the protocol information and remove redundant information from the first plurality of call control signaling transmissions based on associations of the protocol information; and
determine the first correlation flag for the first correlated network transaction, wherein the correlation flag indicating that the first correlated network transaction comprises a complete network transaction or an incomplete network transaction;
a second communication module configured to receive the first correlated network transaction, the first correlated network transaction routed to the second communication module based on if the first correlation flag indicates that the first correlated network transaction is an incomplete network transaction; and a second correlation module configured to correlate, if the first correlation flag indicates that the first correlated network transaction is an incomplete network transaction, the first correlated network transaction with a second call control signaling transmission based on at least one of the first correlation flag, information associated with the second call control signaling transmission, and information associated with the first correlated network transaction to form a second correlated network transaction, wherein the correlate the first correlated network transaction comprising at least one of group one or more parts of the first correlated network transaction based on associations of the protocol information and the second call control signaling transmission together and remove redundant information from the first correlated network transaction and the second call control signaling transmission based on associations of the protocol information.

19. The apparatus of claim 18, further comprising a network control module configured to determine a network performance metric based on the second correlated network transaction.

20. The apparatus of claim 19, the network control module further configured to modify a network configuration parameter based on the network performance metric.

21. The apparatus of claim 18, further comprising:
a third communication module configured to receive a third plurality of call control signaling transmissions from a third plurality of communication networks;
a third correlation module configured to:
correlate the third plurality of call control signaling transmissions based on information associated with the third plurality of call control signaling transmissions to form a third correlated network transaction; and
determine a third correlation flag for the third correlated network transaction, wherein the third correlation flag indicating that the third correlated network transaction comprises a complete network transaction or an incomplete network transaction;
the third communication module further configured to:
communicate the third correlated network transaction to the second correlation module based on if the third correlation flag indicates that the third correlated network transaction is an incomplete network transaction; and
communicate the third correlated network transaction to a master correlation module based on if the third correlation flag indicates that the third correlated network transaction is a complete network transaction.

22. The apparatus of claim 21, further comprising the second correlation module configured to correlate, if the third correlation flag indicates that the third correlated network transaction is an incomplete network transaction, the first correlated network transaction, the second call control signaling transmission, and the third correlated network transaction based on at least one of the first correlation flag, the third correlation flag, information associated with the second call control signaling transmission, information associated with the first correlated network transaction, and information associated with the third correlated network transaction to form a network transaction.

23. The apparatus of claim 18, further comprising a storage module configured to store the first correlated network transaction.

24. An apparatus for correlating network transactions, comprising:
means for receiving a first plurality of call control signaling transmissions from a first plurality of communication networks;
means for correlating the first plurality of call control signaling transmissions based on protocol information associated with the first plurality of call control signaling transmissions to form a first correlated network transaction, wherein the means for correlating the first plurality of call control signaling transmissions comprising at least one of means for grouping one or more of the first plurality of call control signaling transmissions together based on associations of the protocol information and means for removing redundant information from the first plurality of call control signaling transmissions based on associations of the protocol information;
means for determining a first correlation flag for the first correlated network transaction, wherein the correlation flag indicating that the first correlated network transaction comprises a complete network transaction or an incomplete network transaction;
means for transmitting the first correlated network transaction to a means for receiving the first correlated network transaction based on if the first correlation flag indicates that the first correlated network transaction is an incomplete network transaction;
means for transmitting the first correlated network transaction to a master monitor server based on if the first correlation flag indicates that the first correlated network transaction is a complete network transaction;
means for receiving the first correlated network transaction, the first correlated network transaction routed to the means for receiving the first correlated network transmission based on a first correlation flag; and
means for correlating the first correlated network transaction with a second network transmission based on at least one of the first correlation flag, information associated with the second call control signaling transmission, and information associated with the first correlated network transaction to form a second correlated network transaction, wherein the means for correlating the first correlated network transaction comprising at least one of means for grouping one or more parts of the first correlated network transaction and the second call control signaling transmission together based on associations of the protocol information and means for removing redundant information from the first correlated network transaction and the second call control signaling transmission based on associations of the protocol information.

* * * * *